(12) United States Patent
Kollaritsch et al.

(10) Patent No.: US 8,719,743 B1
(45) Date of Patent: May 6, 2014

(54) METHOD AND SYSTEM FOR IMPLEMENTING CLOCK TREE PROTOTYPING

(71) Applicant: Candence Desgin Systems, Inc., San Jose, CA (US)

(72) Inventors: Paul W. Kollaritsch, Nocogdoches, TX (US); Oleg Levitsky, San Jose, CA (US); Lokeswara R. Korlipara, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/632,138

(22) Filed: Sep. 30, 2012

Related U.S. Application Data

(63) Continuation-in-part of application No. 13/097,818, filed on Apr. 29, 2011.

(51) Int. Cl.
*G06F 17/50* (2006.01)

(52) U.S. Cl.
USPC ........................................................ 716/104

(58) Field of Classification Search
USPC ......... 716/100–101, 103–106, 108, 118, 119, 716/122, 124, 125, 132, 134
See application file for complete search history.

(56) References Cited

U.S. PATENT DOCUMENTS

| | | | |
|---|---|---|---|
| 6,496,972 B1 * | 12/2002 | Segal .............................. | 716/103 |
| 6,874,135 B2 | 3/2005 | Gupta et al. | |
| 7,380,233 B2 | 5/2008 | Bickford et al. | |
| 7,603,643 B2 | 10/2009 | McCracken | |
| 7,802,215 B2 * | 9/2010 | Reddy et al. ................... | 716/113 |
| 8,095,898 B1 * | 1/2012 | Wu et al. ........................ | 716/102 |
| 8,122,398 B2 | 2/2012 | Veller et al. | |
| 8,181,145 B2 | 5/2012 | Rice | |
| 2003/0237067 A1 | 12/2003 | Mielke | |
| 2006/0031699 A1 * | 2/2006 | Arthanari et al. .............. | 713/500 |
| 2006/0053395 A1 * | 3/2006 | Lai et al. ........................... | 716/6 |
| 2007/0277144 A1 | 11/2007 | Veller | |
| 2009/0013298 A1 | 1/2009 | Fouad | |
| 2009/0210840 A1 * | 8/2009 | Berry et al. ........................ | 716/6 |
| 2012/0124534 A1 | 5/2012 | Kalafala | |
| 2013/0061193 A1 * | 3/2013 | Lasher et al. .................. | 716/114 |

OTHER PUBLICATIONS

Hierarchical Scan Synthesis Methodology Using Test Models, Synopsys, Oct. 2001, 8 Pages.
Non Final Office Action dated Jul. 31, 2012 for U.S. Appl. No. 13/097,818.
Final Office Action dated Jan. 10, 2013 for U.S. Appl. No. 13/097,818.
Non-Final Office Action dated Jul. 12, 2013 for U.S. Appl. No. 13/097,818.
Notice of Allowance dated Nov. 22, 2013 for U.S. Appl. No. 13/097,818.

* cited by examiner

*Primary Examiner* — Stacy Whitmore
(74) *Attorney, Agent, or Firm* — Vista IP Law Group, LLP

(57) ABSTRACT

Disclosed is an improved method, system, and computer program product for implementing flexible models to perform efficient prototyping of clock structures in electronic designs, which allows for very efficient analysis of the electronic designs. Some approaches pertain to usage of the flexible abstraction models that also include clock abstractions to more efficiently perform analysis upon the electronic designs. This allows greater analysis efficiency with regards to timing analysis and physical analysis.

37 Claims, 30 Drawing Sheets

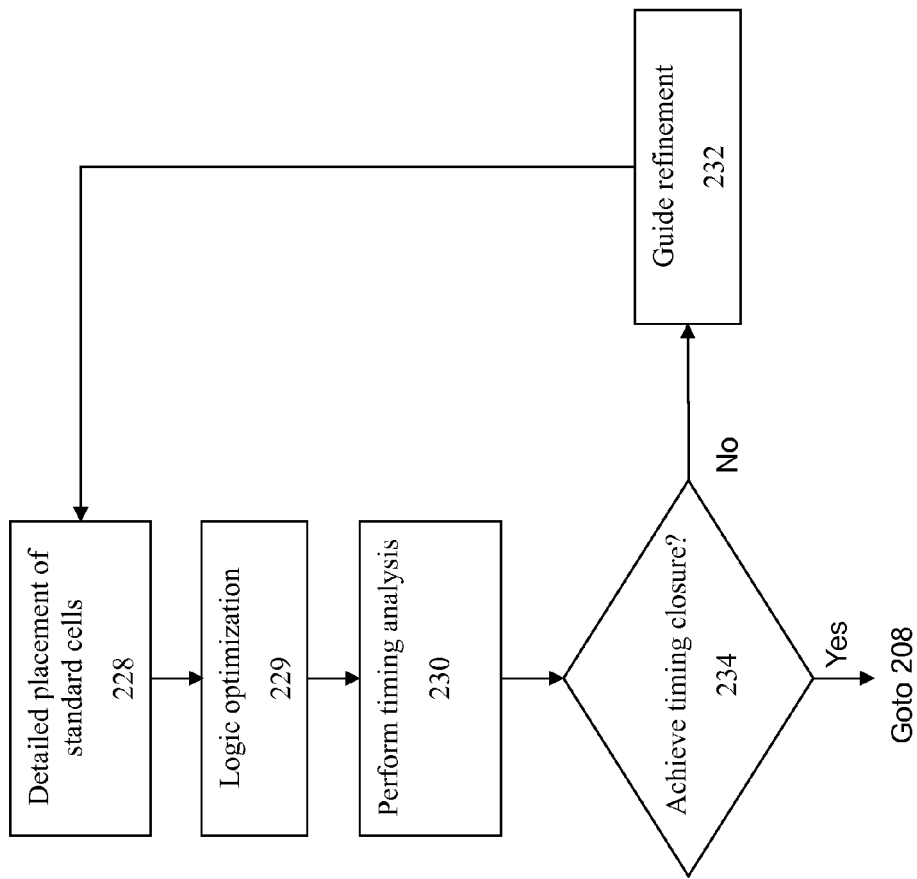

METHOD AND SYSTEM FOR IMPLEMENTING CLOCK TREE PROTOTYPING

CROSS-REFERENCE TO RELATED APPLICATIONS

The present application is a continuation-in-part of U.S. application Ser. No. 13/097,818, filed on Apr. 29, 2011, which is hereby incorporated by reference in its entirety.

BACKGROUND

The invention is directed to an improved approach for implementing prototyping and analysis of electronic circuit designs.

A semiconductor integrated circuit (IC) has a large number of electronic components, such as transistors, logic gates, diodes, wires, etc., that are fabricated by forming layers of different materials and of different geometric shapes on various regions of a silicon wafer. Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools.

The EDA tools may be used to perform early stage analysis and examinations of an electronic design. For example, the EDA tools may be used to determine whether the electronic design is capable of meeting timing requirements along signal paths in the design. Failure of a design to adequately meet timing requirements could result in an electronic product that may fail under usage and/or not function according to its intended purpose. Therefore, for design and planning purposes, it is very desirable for engineers and designers to be able to obtain an early-stage estimate of the likelihood that a particular design will meet its timing requirements. Early identification of timing problems allows the designer to address the timing identified issues in a much more efficient way than if such timing problems are discovered later in the design cycle.

The problem is that conventional modeling and prototyping techniques causes the prototyping and analysis process to consume an excessive amount of time and computing resources, particularly given the large number of objects and features that exist in modern electronic designs. In addition, conventional modeling and prototyping approaches can fail to identify timing errors at an early stage of the design cycle, such that timing problems are only identified once the analysis has returned to the top level.

As a particular example, consider the process to perform clock tree prototyping of an electronic design. The increasing complexity of modern designs (e.g., Gigascale designs) poses numerous implementation challenges. Given the large number of components such as flip flops in Gigascale designs, one key challenge faced by designers involves accurately planning and implementing the clock tree in the design. The clock tree has a profound effect on the design closure and timing, making it increasingly important to ensure that the process is performed correctly.

One of the main challenges involved in clock tree synthesis for Gigascale designs is processing and system capacity, since early estimation usually involves handling of large amounts of data, which translates into long runtimes and large memory requirements. In conventional approaches, this capacity constraint limits the designer's ability to explore different design possibilities. Another significant challenge pertains to accuracy; with increasing frequencies, the margin of error for the estimates becomes much smaller. At lower process nodes coupling, DFY/DFM (design for yield/design for manufacturing) effects significantly impact routing and indirectly affect timing. In addition, On Chip Variation (OCV) becomes another major challenge, since growing die sizes can cause OCV effects that reduce available time. This effect can be further compounded because of cross partition paths in hierarchical designs.

Therefore, there is a need for an improved approach to implement prototyping and/or modeling for electronic designs that allows for efficient analysis of the electronic designs. There is particularly a need for an improved approach to perform clock tree modeling and prototyping for early-stage analysis of the electronic designs.

SUMMARY

Embodiments of the present invention provide an improved method, system, and computer program product for implementing flexible models to perform efficient prototyping of clock structures in electronic designs, which allows for very efficient analysis of the electronic designs. Some embodiments of the invention pertain to usage of the flexible abstraction models that also include clock abstractions to more efficiently perform analysis upon the electronic designs. The invention therefore allows greater analysis efficiency with regards to timing analysis and physical analysis (e.g., clock analysis, timing analysis, congestion analysis, placement analysis, and/or partition analysis).

Other additional objects, features, and advantages of the invention are described in the detailed description, figures, and claims.

BRIEF DESCRIPTION OF FIGURES

FIGS. 2A-F provide flowcharts of one or more approaches for performing hierarchical prototyping using flexmodels according to some embodiments of the invention.

DETAILED DESCRIPTION

Figure 1:
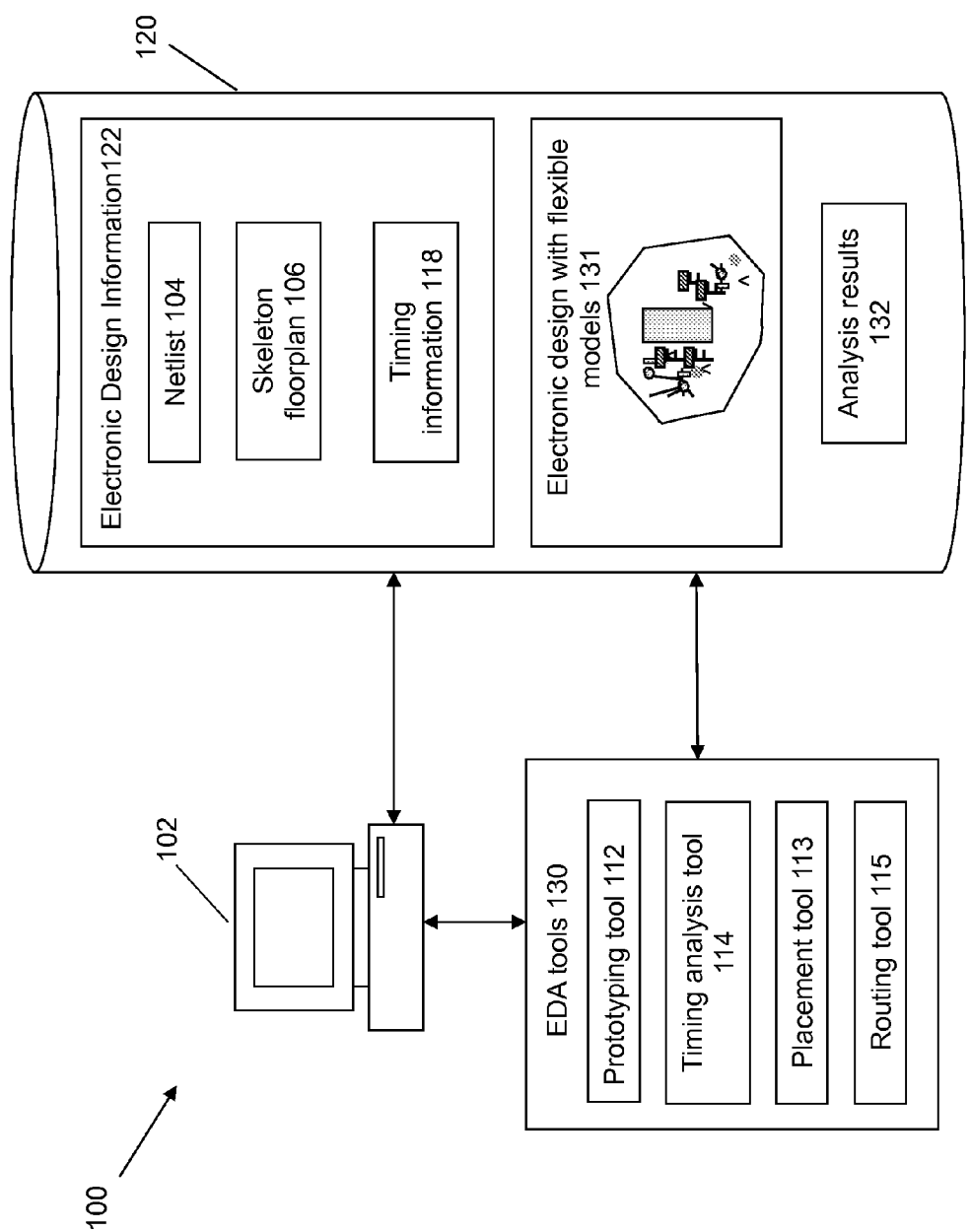
FIG. 1 depicts an architecture of a system for performing hierarchical prototyping using flexmodels according to some embodiments of the invention.

This disclosure provides an improved approach to perform clock tree modeling and prototyping for early-stage analysis of the electronic designs. According to some embodiments, provided is an approach that utilizes flexible models (also referred to herein as "flexible abstraction models" or "flexmodels"). A flexmodel is an abstraction of a circuit portion that allows for very efficient analysis of electronic designs. The flexmodel replaces a substantial portion of the internal paths of a circuit portion with a model that is significantly reduced in size so that the prototype circuit design is much smaller than the entirety of the original circuit, which allows for very efficient analysis.

Clock tree information is extracted and processed while creating a flexmodel and relevant data is embedded into the flexmodel for use in the downstream design steps. Therefore, according to some embodiments, the flexmodel provides both circuit component abstraction and clock abstraction. Design exploration and planning are completed using the present techniques. Clock modeling can be utilized both before and after partitions are identified, e.g., to include clock branching points at the partition boundaries as described in more detail below. Clock prototyping is performed to build an accurate hierarchical clock tree using the partition pin locations and latency estimates extracted from the flexmodels. This type of abstraction provided by the flexmodels thereby provides a unique approach to handle the capacity requirements for large designs (e.g., Gigascale designs) while still retaining the relevant information needed to plan and implement accurate clock trees for such designs. It is noted that the inventive approach can be extended to be applied to any design abstraction, and is not to be limited in its application only to flexmodels.

Flexible Abstraction Models

This portion of the disclosure provides a description of how flexible abstraction models (also referred to herein as "flexmodels") can be implemented according to some embodiments of the invention. As noted above, a flexmodel is an abstraction of a circuit portion that allows for very efficient analysis of electronic designs, where the flexmodel replaces a substantial portion of the internal paths of a circuit portion with a model that significantly reduced in size so that the prototype circuit design is much smaller than the entirety of the original circuit. One way to accomplish this is to remove internal R-to-R (register to register) paths and replace those paths with flexible filler cells, which may be implemented as a type of standard cells having specified connection and behavioral parameters appropriate as nonfunctional filler cells. In this manner, the flex model would remove all internal paths while it maintains paths that extend to input and output ports, the interface paths.

In addition, optimizations can be performed for all (or substantially all) of the interface paths, so that there is confidence at the top level that the models will accurately reflect the best possible timing (and physical characteristics) and so that the designer can analyze if a floorplan can be made such that the circuit design will be acceptable for its intended functionality. This can be implemented by taking all (or at least a substantially large number) of the timing paths, and optimizing those paths, instead of just identifying just a select few critical paths. This can be accomplished by setting the input and output delays for each flex model so that they are extremely small, which essentially means that a negative delay is established for those input/outputs for the models. For each flex model, interface paths are then optimized as much as possible/reasonable to meet these aggressive timing requirements. In this way, there is great confidence that the timing of this model will be as good as it can possibly be, so that when the analysis is performed at the top-level of the design, the remedy is changing the top-level floorplan, and not improving the models. On the other hand, if the timing requirements cannot be met, then this issue can be identified early enough so that the designer can more easily correct the problem. In this way, the invention provides very good visibility into the timing behavior of the circuit design, in an accurate manner, at an early stage of the design cycle.

FIG. 1 shows an architecture of a system 100 for implementing hierarchical prototyping according to some embodiments of the invention. System 100 may include one or more users at one or more user stations 102 that operate the system 100 to design, edit, and/or analyze electronic designs. The users at user station 102 correspond to any individual, organization, or other entity that uses system 100 for designing or analyzing an electronic design. Such users include, for example, chip architects, product designers, design engineers, and/or verification engineers. User station 102 comprises any type of computing station that may be used to operate, interface with, or implement EDA tools, applications or devices 130. Examples of such user stations 102 include for example, workstations, personal computers, or remote computing terminals. User station 102 comprises a display device, such as a display monitor, for displaying electronic design layouts and processing results to users at the user station 102. User station 102 also comprises one or more input devices for the user to provide operational control over the activities of system 100, such as a mouse or keyboard to manipulate a pointing object in a graphical user interface.

The user station 102 may be associated with one or more computer readable mediums or storage devices 120 that hold information 122 corresponding to the user's electronic design. Computer readable storage device 120 comprises any combination of hardware and software that allows for ready access to the data that is located at the computer readable storage device 120. For example, computer readable storage device 120 could be implemented as computer memory operatively managed by an operating system. The computer readable storage device 120 could also be implemented as an electronic database system having storage on persistent and/or non-persistent storage.

The electronic design information 122 comprises any set of information or parameters that the user has developed for information relating to an electronic design which can be used to perform hierarchical prototyping and/or analysis of the electronic design. In some embodiments, such information may include, for example, a netlist 104, a floorpan 106, and timing information 118. The netlist 104 may be implemented using any suitable type of design language, such as for example, Verilog or VHDL. In some embodiments, when the invention is applied at an early stage of the design cycle, the floorplan 106 comprises a skeleton floorplan that includes a sufficient amount of information about the floorplan such that analysis and planning can be performed. In other words, the skeleton floorplan does not need to include the extensive level of detail that is present in a final floorplan, but may include a general outline of the location of circuit elements and of the I/O elements. The timing information 118 comprises information from the designer regarding the expected timing behavior of the basic circuit building blocks. In some embodiments, the timing information is contained within a timing file (e.g. a Liberty file or a .lib timing file).

The electronic design information 122 is used as inputs by the prototyping tool 112 to create a prototype 131 of the circuit design having the flexmodels. A timing analysis tool 114 can then utilize the prototype 131 to perform timing analysis to generate analysis results 132. A placement tool 113 and a routing tool 115 can also be used to place and route the prototype 131. The timing analysis can be performed without placement tool 113 and routing 115, or after placement by placement tool 113, or after placement and routing by both the placement tool 113 and the routing tool 115. Optimizations can be performed, based at least in part on the analysis results 132, to optimize the circuit design to meet timing requirements.

Figure 2A:
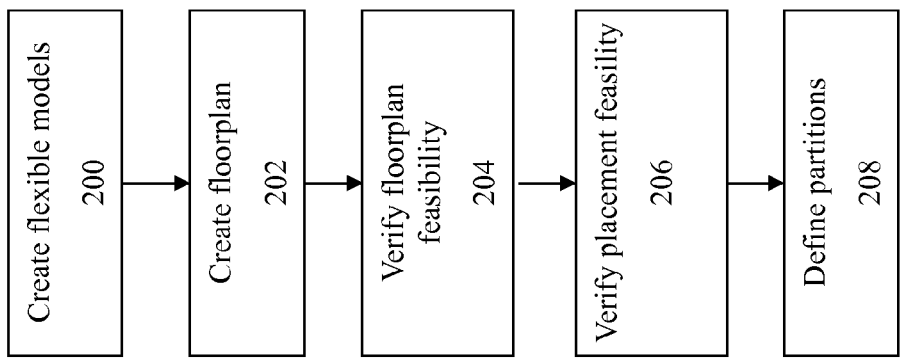

FIG. 2A shows a flowchart of an approach for implementing some embodiments of the invention. At 200, flexible models are created for electronic design. This action in some embodiments creates the flexmodels on disk, and then replaces parts of the original netlist with flexmodels that includes macros, interface standard cells, and flexible filler cells (also referred to herein as "flexfiller cells"), where the flexible filler cells replace a substantial portion of the internal paths of a circuit portion. By replacing internal paths with flexible filler cells, this allows the prototype to be much smaller in size than the original design. Unlike conventional filler cells, flexible filler cells according to some embodiments of the invention include connections. According to some embodiments, the flexible filler cells can be implemented as a type of standard cell so that all the other EDA tools will be able to operate on them. In an alternate embodiment, the flexible filler cells can be implemented as a macro with standard or non-uniform sizes and other parameters.

Figure 3:
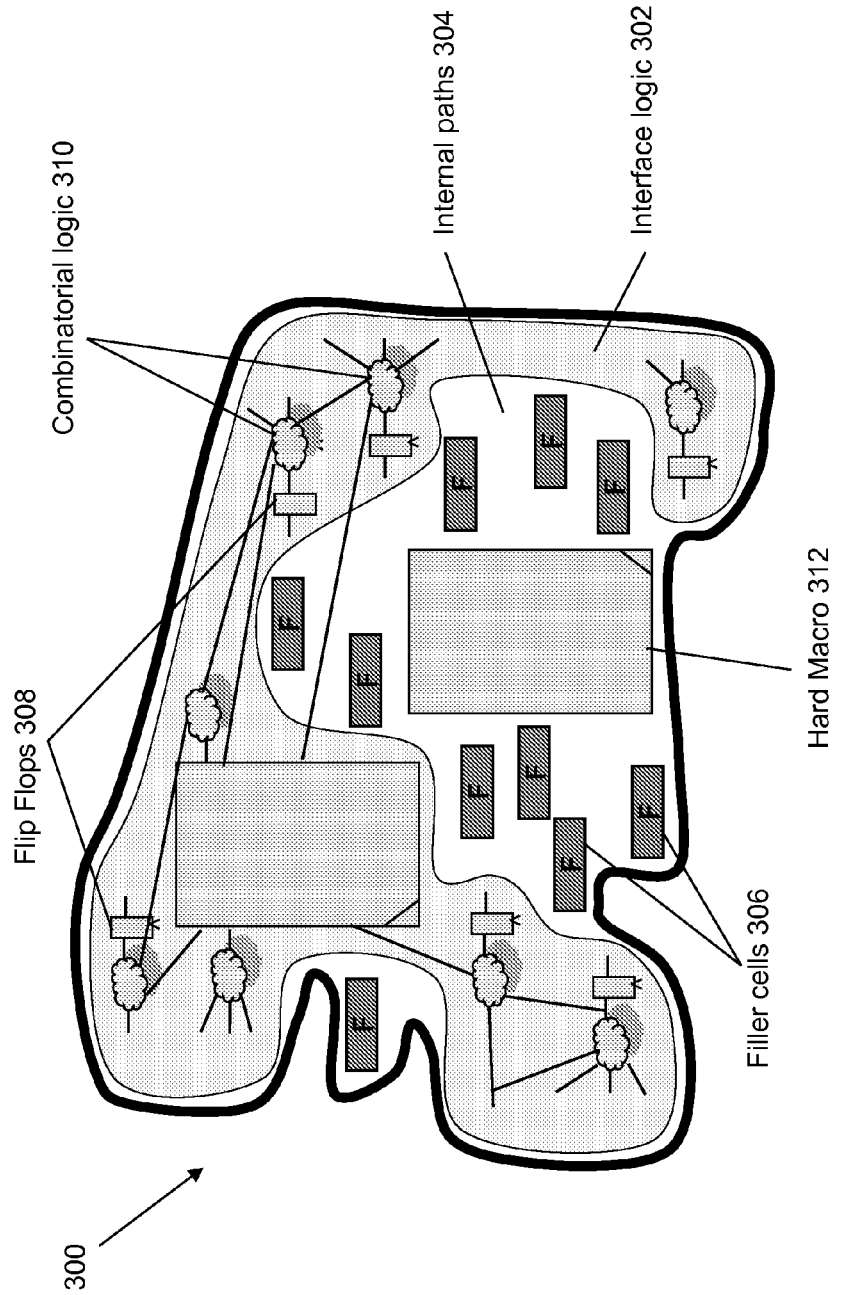
FIG. 3 shows an illustrative flexmodel according to some embodiments of the invention.

FIG. 3 illustrates an example flexmodel 300. Flexmodel 300 comprises interface logic portion 302 and internal paths 304. Internal paths 304 comprise, for example, internal R-to-R (register to register) paths that have been replaced with flexible filler cells 306. In some embodiments, the flexible filler cells 306 may be implemented as a type of standard cells having specified connection and behavioral parameters appropriate as nonfunctional filler cells, with a standard number of input/output ports and a standard size. The interface logic portions 302 (e.g., interface standard cells) are retained in the flex model. Thus, structures such as flip flops 308 and combinatorial logic 310 in the interface logic portions 302 are retained in the flex model netlist. In this manner, the flex model would remove all internal paths while maintaining paths that extend to input and output ports. Hard macros and structures (such as memory/hard macro 312) may be retained in their original form in the flex model 300.

In addition, optimizations are performed for all and/or a substantial portion of the interface logic paths 302, so that there is confidence at the top level that the models will accurately reflect the best possible timing (and physical characteristics) so that the designer can analyze if a floorplan can be made such that the circuit design will be acceptable for its intended functionality. This can be implemented by taking all (or at least a substantially large number) of the timing paths, and optimizing those paths, instead of just identifying just a select few critical paths. This can be accomplished by setting the target input and output delays for each flex model so that they are extremely small, which essentially means that a negative delay is established for those input/outputs for the models. Since the target input and output delays for a flexmodel are set to 0, all paths will never be met, but optimization will then see all possible paths as not meeting the goal and so force the optimizer to work on reducing all paths as much as possible. In some embodiments, a setting is made on the optimizer can be set forcing it to optimize all negative paths, and not just the worst percentage (e.g., 20%) of failing (negative) paths, which is the default setting for certain optimizers. Optimizers by default are configured not to waste runtime working on failing paths which when fixed will not improve the worst timing path. For each flexmodel, interface logic paths 302 are then optimized as much as possible/reasonable to meet these design-independent and aggressive timing constraint requirements. In this way the interface delays for each of the flexmodels are as fast as possible, allowing floorplanning at the chip-level with the flexmodels to achieve results that are as fast as possible. This means that timing problems can be detected very quickly since: (a) the analysis can run very fast because of a reduction in the number of standard cells (e.g., 10 times faster because of there are 10 times less standard cells); and (b) only top-level changes are needed for later optimization (e.g., where possible optimizations or changes can include changing locations of flexmodels, optimization of top-level gates), since the interface path timing within the flexmodels (already optimized) cannot be improved or further optimized.

Figure 2B:
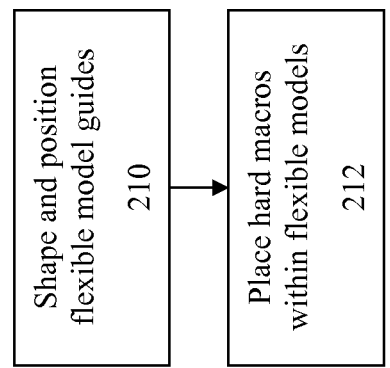
Figure 2C:
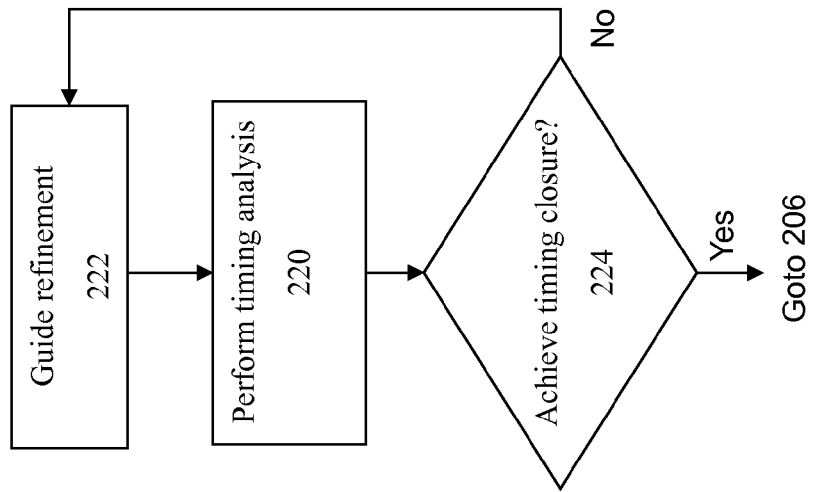
Figure 2E:
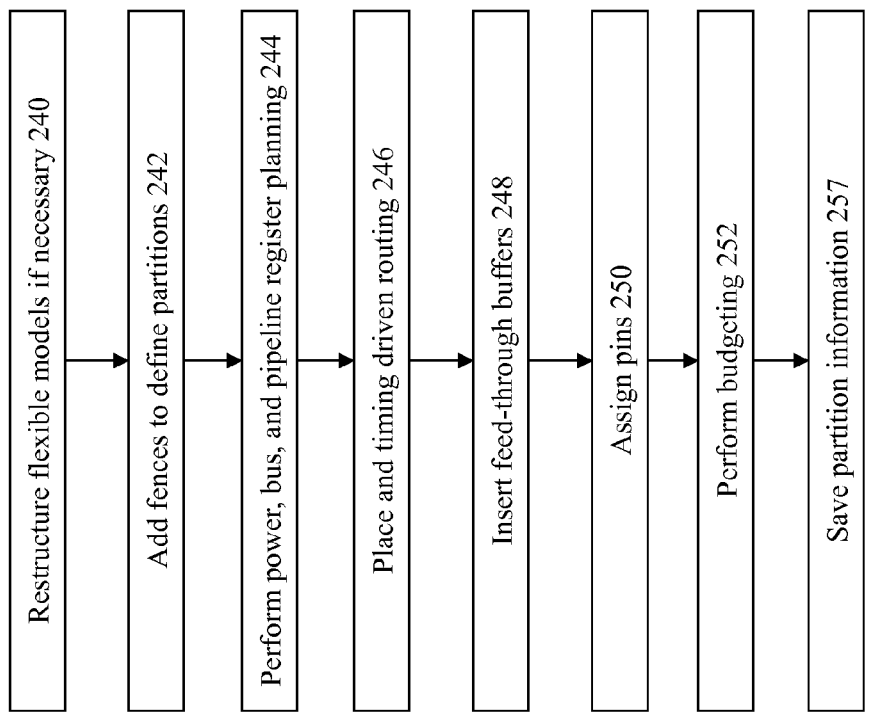
Figure 2F:
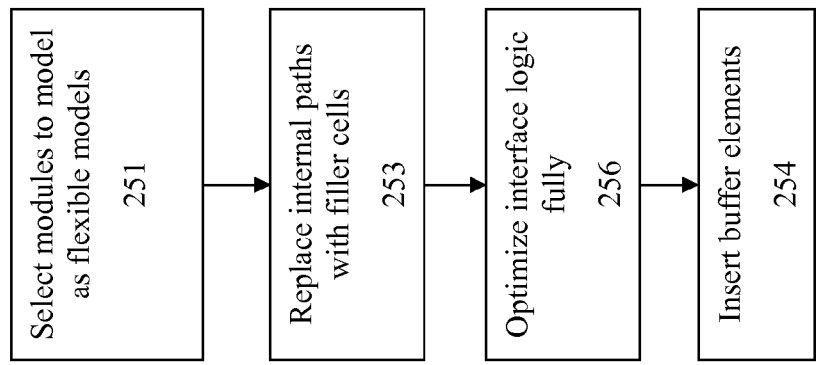

This document will now describe in more detail an approach for creating flex models according to an embodiment of the invention. FIG. 2F shows a flowchart of an illustrative approach to create flexmodels. At 251, the first step is to select the modules in the full netlist that are to be modeled as flexmodels. This can be accomplished in some embodiments by identifying which of the modules corresponds to a threshold number of instances. A directory can be created to store the original netlist of each model.

A threshold number of instances can be identified for automated identification of the modules to be modeled as flexmodels. The threshold can be identified as a percentage of the overall instances in the design. Alternatively, the threshold can be specified as a combination of a minimum/maximum number of instances. For example, assume that a minimum threshold is set at "2 k" (i.e., 2000) and a maximum threshold is set at "5 k". Therefore, when performing a top-down walk though the hierarchy, any module that exceeds the minimum threshold number and is beneath the maximum threshold number would be modeled as a flexmodel. The children of that module would not need to be separately modeled. In addition, an exclusion setting can also be utilized. The "exclusion" designation would explicitly exclude a given module from being modeled as a flexmodel. In some embodiments, this exclusion designation would not apply to that module's children in the hierarchy.

Figure 6:
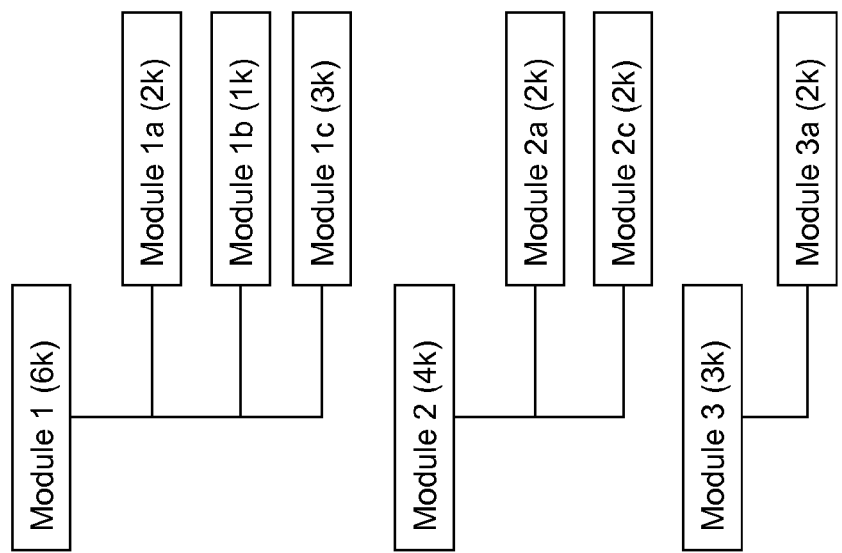
FIG. 6 shows an example modelsource structure according to some embodiments of the invention.

In the example hierarchy of FIG. 6, it can be seen that module 1 falls outside this example min/max range to identify as a flex model, since module 1 has 6 k instances and the min/max range extends from 2 k to 5 k. Therefore, its children will be examined to see if any fall within the specified parameters. Here, child modules 1a (2 k) and 1c (3 k) do fall within the min/max range, and hence would be identified for flexmodels. Module 2 would also be identified to be modeled as a flexmodel, since its instance count (4 k) falls within the specified range. Since module 2 is being identified for modeling as a flexmodel, its children (2a and 2b) would not need to be modeled, since module 2 in its entirety will be modeled. Module 3 would normally be identified as a candidate for a flexmodel, since its instance count (3 k) falls within the specified min/max range. However, module 3 was also specifically designated to be excluded from being a flex model. Therefore, its children will be reviewed to see if any fall within the specified parameters. Here, child module 3a has an instance count of 3 k which falls within the specified min/max range, and hence should be identified as a candidate for a flexmodel.

The original full netlist (e.g., a verilog netlist) for each identified module would be stored in the appropriate portion of the model directory.

At 253, the next step is to review each module, and to replace internal paths with flexible filler cells. For example, all internal R-to-R (register-to-register) paths would be replaced with flexfiller cells. On the other hand, any logic that directly connects to an input or output port would not be replaced with flexible filler cells. The number of flexible filler cells is selected to approximate the area of the internal path structures that are being replaced.

Figure 7:
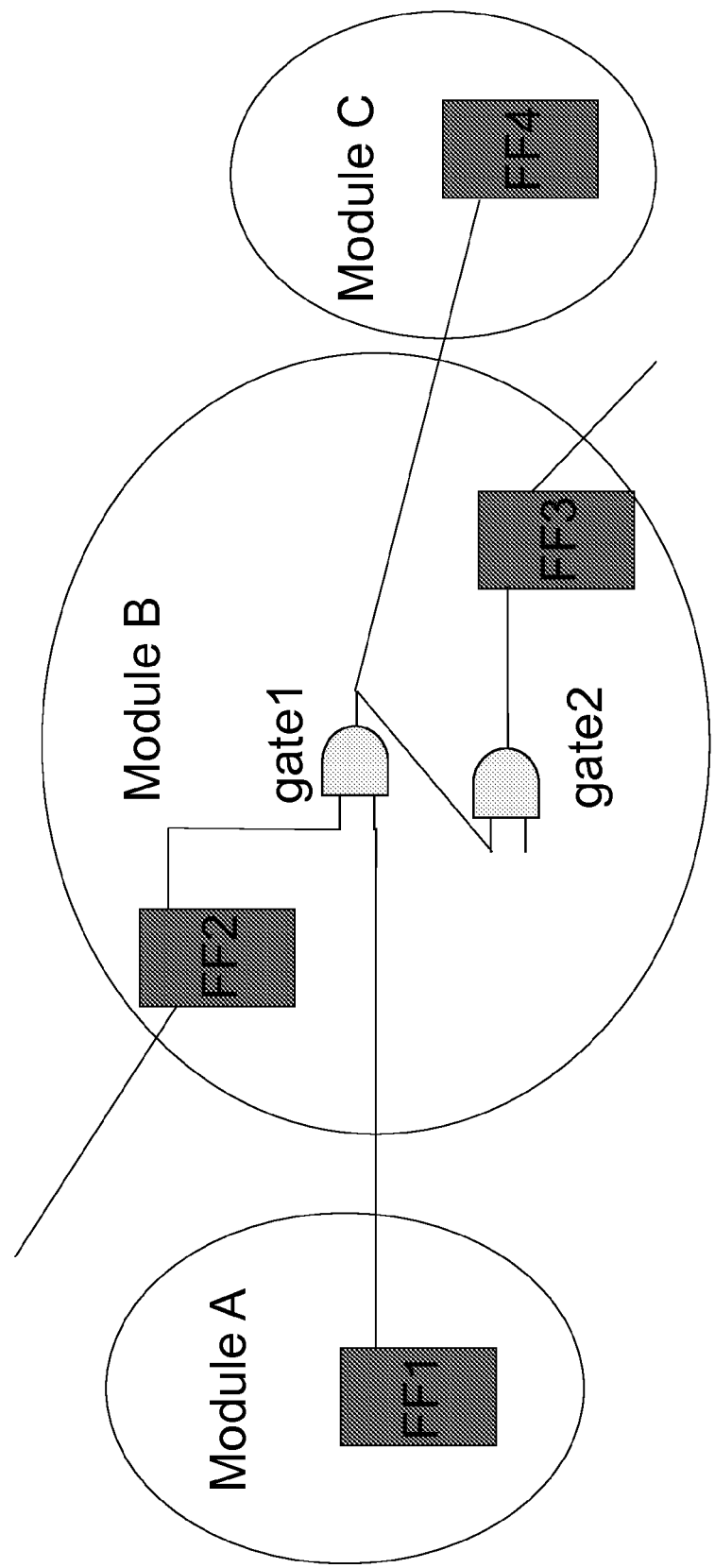
FIG. 7 illustrates an example design portion.

To illustrate, consider the design portion shown in FIG. 7. In this example, Gate1 will be preserved (i.e. part of the flexmodel for ModuleB), since it is in a Register-to-Output path (FF2→gate1→OutPort). Gate2 will also be preserved since it is in an Input-to-Register path (InPort→gate1→gate2→FF3). If FF1 is inside ModuleB, then gate2 would NOT be in flexmodel B (but gate1 would).

Figure 8:
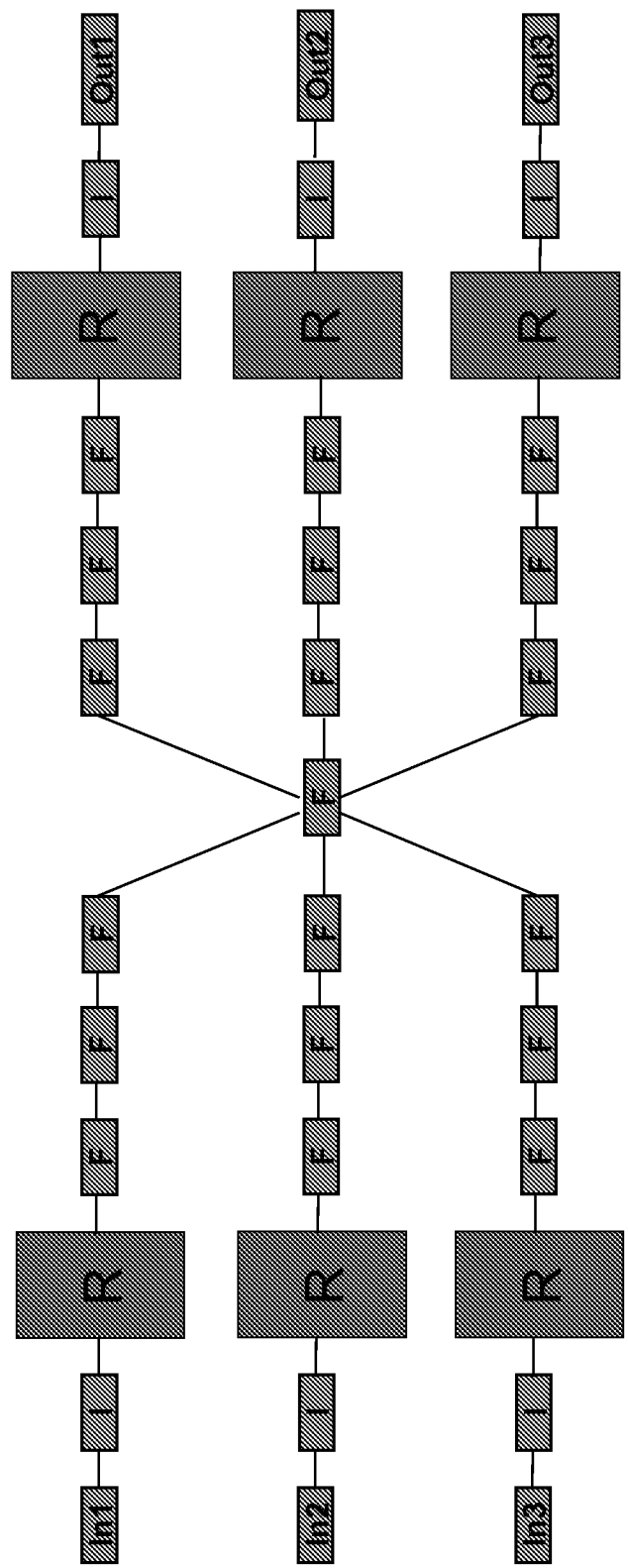
FIGS. 8, 9, and 10 illustrate example flexfiller arrangements according to some embodiments of the invention.

The flexfiller cells can be organized in any suitable manner within the flexmodel. FIG. 8 shows one possible organization of the flexfiller cells ("F") into a star arrangement. In this approach, a central flexfiller cell is used to centrally connect the rest of the flexible filler cells. The advantage of this approach is that the number of nets between flexible filler cells is minimized. In addition, most flexible filler cells can be standardized to include only two ports or terminals. The problem with this approach is that the central flexible filler cell would need to be separately configured in a custom manner to ensure that it has a sufficient number of ports to handle its duties as the central point of the arrangement.

FIG. 8 also shows the flexfiller cells ("F") connected to registers ("R") which in turn are connected to interface logic ("I"). The interface logic ("I") are connected or either input ports ("In1", "In2", "In3") or output ports ("Out1", "Out2", "Out3").

Figure 9:
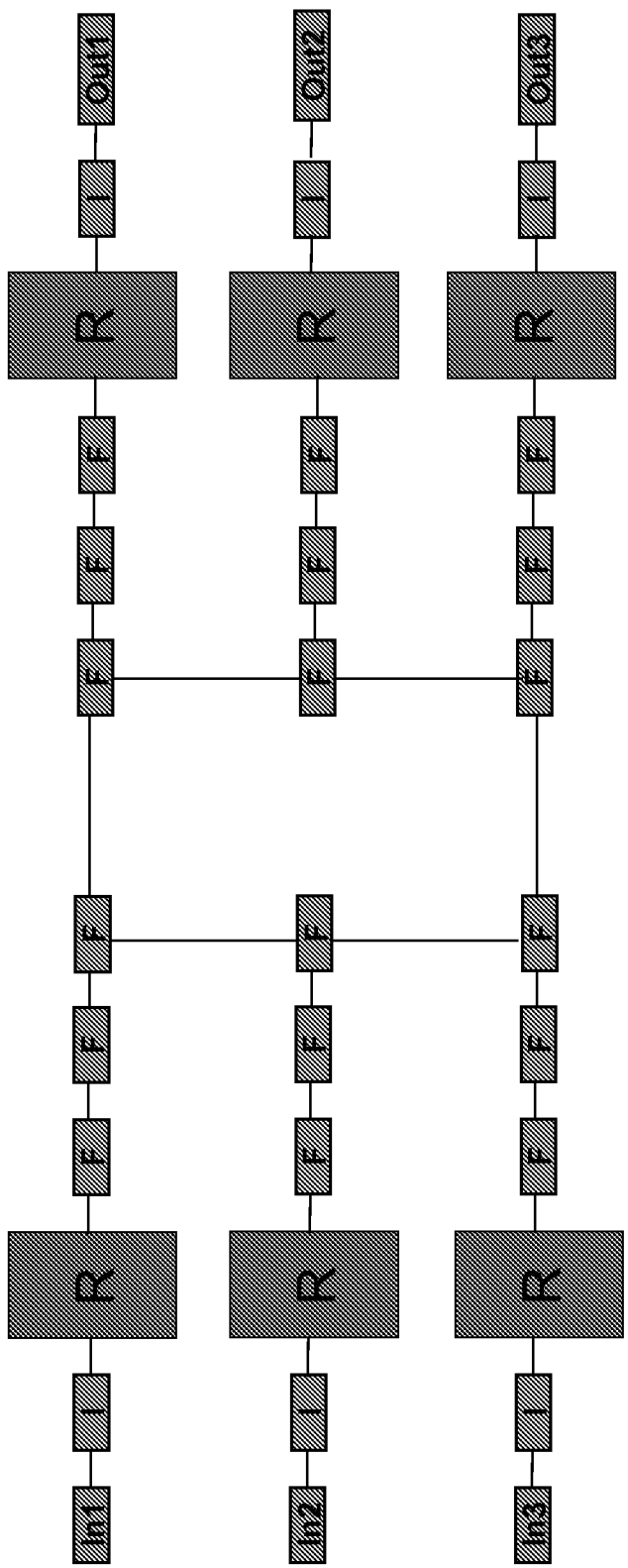

FIG. 9 shows an alternate hub arrangement for the flexible filler cells. The advantage of this approach is that each flexible filler cell ("F") now only needs at most three input/output ports. Therefore, the flexible filler cells ("F) can all be standardized, e.g., every flexible filler cell can be configured to be the same with three ports. However, most of the flexible filler cells would have an excess port, where to the extent a given flexible filler cell only needs to use two ports, the extra port will remain unused. FIG. 9 also shows the flexfiller cells ("F") connected to registers ("R") which in turn are connected to interface logic ("I"). The interface logic ("I") are connected or either input ports ("In1", "In2", "In3") or output ports ("Out1", "Out2", "Out3").

Figure 10:
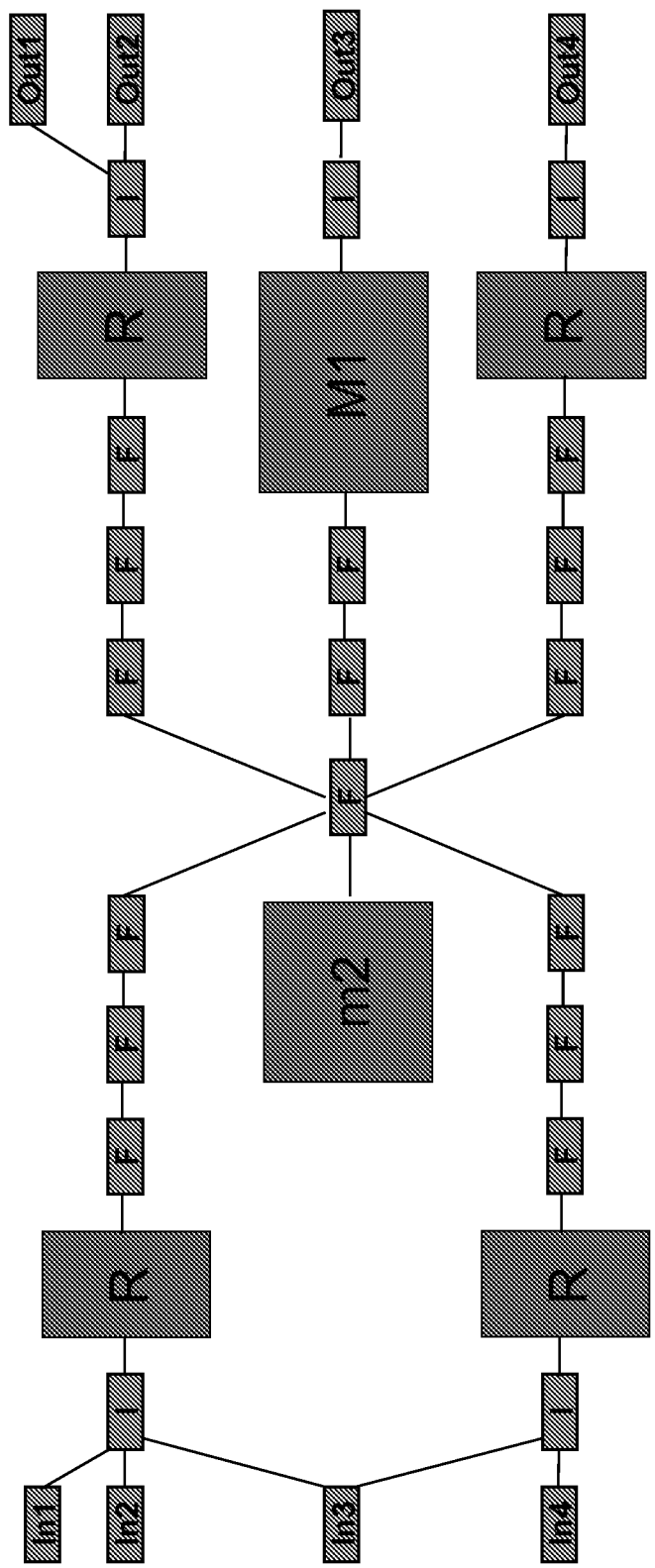

FIG. 10 shows the star arrangement of the flexfiller cells ("F"), which includes a central flexfiller cell that centrally connects the rest of the flexible filler cells. As before, this figure shows flexfiller cells ("F") connected to registers ("R") which in turn are connected to interface logic ("I"). In addition, this figure also shows an interface macro ("M1") that connects to an interface logic ("I"). An internal macro ("m2") is shown which only connects to a flexfiller ("F"). In this example, there are also interface logic ("I") which are connected to multiple input ports ("In1", "In2", "In3") or output ports ("Out1", "Out2").

Replacing internal paths with flexfiller cells will tremendously reduce the amount of data that must be analyzed for each module. In many cases, the netlist will be reduced by at least 90 percent just by replacing internal paths with flexible filler cells.

Next, at 256, the timing constraints file (e.g., an "SDC" or "Synopsys Design Constraints" file) for each module is configured so that all interface logic of the flexmodel is fully optimized. In one embodiment, this is accomplished by setting the input and output delays to be equal to the same delay as the clock period that is defined for the clock associated with that port. This essentially gives none of the clock period to the logic within the flex model, since all of the clock period is consumed outside the module.

In some embodiments, a setting is made on the optimizer forcing it to optimize all negative paths, and not just the worst percentage (e.g., 20%) of failing (negative) paths, which is the default setting for certain optimizers. Optimizers by default are configured not to waste runtime working on failing paths which when fixed will not improve the worst timing path. This forces the timing analysis process to optimize every path, no matter how small or short. In this way, the external delays for each of the flexmodels are as fast as possible, allowing floorplanning at the chip-level with the flexmodels to achieve results that are as fast as possible. This means that timing problems can be detected very quickly since: (a) the analysis can run very fast because of a reduction in the number of standard cells (e.g., 10 times faster because of there are 10 times less standard cells); and (b) only top-level changes are needed for later optimization (e.g., where possible optimizations or changes can include changing locations of flexmodels, optimization of top-level gates), since the interface path timing within the flexmodels (already optimized) cannot be improved or further optimized. The advantage of this approach is that since every path is being optimized, this means that very accurate chip-level timing can be achieved. If timing cannot be met between flexmodels, then there are two choices, to either move flexmodels closer together in the floorplan or to give the problem back to the designer at the front end. However, any design that can meet top-level timing requirements using flexmodels which were fully optimized during model creation has a very high likelihood that chip implementation will be able to achieve chip-level timing goals. This is in direct contrast to alternate approaches that selectively identify only a certain percentage of critical paths to analyze, which can result in unpleasant downstream surprises when un-analyzed paths create problems that either cannot be corrected, or can only be corrected by a costly fixes at a late stage of the design cycle.

The optimization, and indeed the total runtime to create a model is very quick since: (1) the full netlist of this model is only a small fraction of the full chip netlist; (2) this fractional netlist has been further reduced (e.g., by another factor of 10) by removing the internal register to register paths; and (3) each model can be created separately on a separate computer in a separate process (e.g., in parallel) and so runtime is linear with the number of computers (e.g. halve the wall-clock runtime for model creation by doubling the number of computers).

At 254, buffer elements may be inserted into the flexmodels to comply with user-driven expectations of certain type of delays. For example, the user may specify certain minimum delay parameters, to account for expected logic to be inserted into the design at a later stage.

After step 254, optionally a fully optimized timing model (e.g., a ".lib" timing model) could be created, and used with other analysis/modeling approaches as its timing model. For example, the fully optimized timing model could be used with a "black box", hard macro, or "black blob" approach of U.S. Pat. No. 7,603,643 as its timing model. Since the interface logic has been fully optimized (from step 256), this timing model can be referred to as a "fully optimized .lib timing model". This would allow the BlockBox, BlackBlob, or hard Macro approaches to obtain some of the benefits of the approach discussed herein, namely: (1) linear wall-clock runtime creation of fully optimized timing model; (2) no need for top-level logic optimization step; and (3) can create timing model once and re-use with many turns of floorplan variations. Of course the flexmodel approach of some embodiments of the invention would still be advantageous over these other approaches that (1) do not provide visibility of child/ internal hard macros; (2) do not have has interface pins (other than at the ports) for top (chip-level) timing constraints (e.g., SDC constraints) to reference; and (3) do not provide insight into the placement of interface standard cells, which allows for more visibility into congestion and connectivity-based placement decisions.

Returning back to FIG. 2A, the next action 202 is to create a floorplan for the circuit prototype, which will provide placement of the flex models onto a floorplan as "guides", which is a combination of a rectilinear shape and location that suggests or provides a soft constraint for a boundary of the flexmodel contents. This action essentially provides the initial placements of flex model guides onto a floorplan. FIG. 2B shows a flowchart of an illustrative approach for creating a floorplan. At 210, the flex model guides are shaped and placed onto the floorplan. In some embodiments, this is a process of serially going through the various flex model guides in the design, and placing the flex model guides in locations on the floorplan so that heavily connected flex model guides are placed closer together. To the extent there are overlaps, the flex model guides may be re-shaped to avoid the overlaps, e.g., by changing or stretching the width/height of the flex model guides to maintain equivalent area while minimizing overlaps with other flex model guides.

Figure 4:
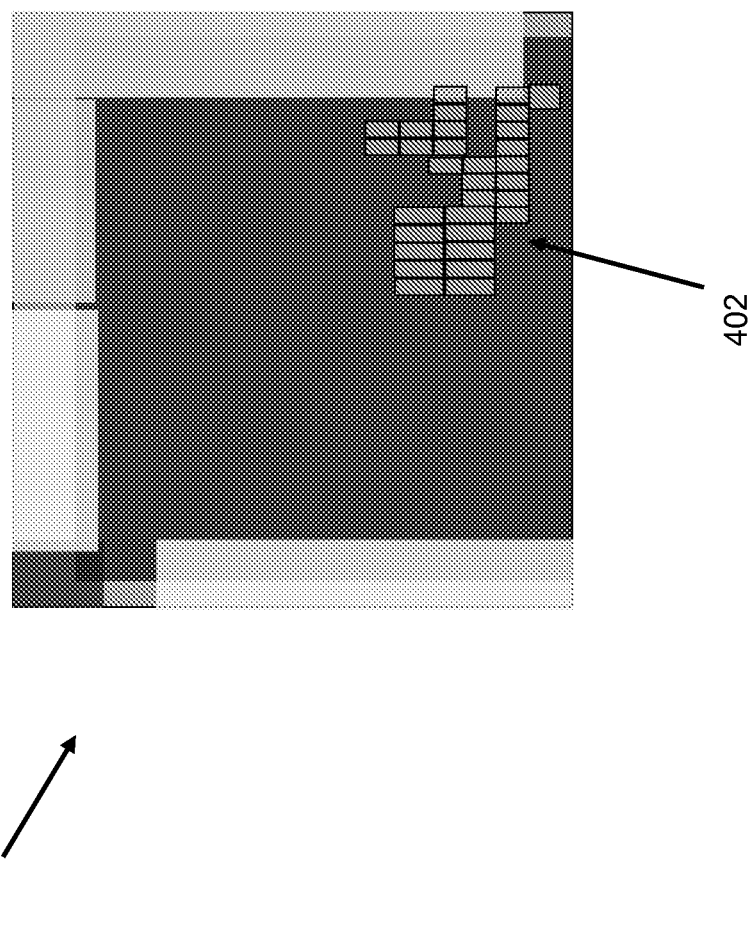
FIG. 4 illustrates a floorplan that has been created with flexmodels according to some embodiments of the invention.

The flexmodels can intermingle with other flexmodels and standard cells, with guides provided onto the floorplan as controls over the extent of the intermingling. At 212, the hard macros 312, 402 of the flexmodel will also be placed onto the floorplan, e.g., as shown in FIG. 4. The hard macros therefore provides limitations over the ability of the flex models to change its shape, since the flex model shape must be able to accommodate the shapes of the hard macros that are within those flex models.

The next action 204 in the flowchart of FIG. 2A is to verify the feasibility of the floorplan created in step 202. FIG. 2C shows a flowchart of an illustrative approach for verifying feasibility of the floorplan. At 222, guide refinement may be performed, e.g., to change the shape and/or location of the guides. The guide refinement activity may be performed for any appropriate reason, e.g., to achieve timing closure as discussed in more detail below.

At 220, timing analysis is performed to check whether the timing requirements can be met with the current floorplan design. The timing analysis is a virtual timer, which assumes zero wire and pin delay for the standard cells, and applies a user given ps_per_micron to long wires, which eliminates the need for calling logic optimization to reduce delay along a long net by adding buffers. The virtual timer, along with fully optimized flexmodels, can eliminate the need for calling logic optimization, a step which normally needs relatively large amount of runtime and memory. Since all interface path delays for the flexmodel have been minimized as much as possible, the top-level designer does not have to re-create the flexmodels due to floorplan changes, and knows that the only way to reduce a failing timing path between two flexmodels is to place them near each other.

Because there is a minimal level of detail at this stage (e.g., because internal paths have been replaced with flexfiller cells), the timing analysis can be performed extremely quickly. For example, consider timing with respect to standard cells. At this stage, standard cells do not necessarily need to be in a precise location within the flexmodel. Therefore, instead of cluttering up the design with specific placement locations for standard cells, one can "assume" the location of the standard cell at the center of the flexmodel. From a timing analysis perspective, a path from a first standard cell in a first flexmodel to a second standard cell in a second flex model can be assumed to travel a path from the center of the first flexmodel to the center of the second flexmodel.

Automatic creation of timing categories between two flexmodels can be implemented for the timing analysis. In addition, from a user interface perspective, only the top path of each category can be visually shown, so that a large number of paths between two flexmodels are coalesced into a much smaller number of paths, allowing a "big picture" view of timing to be seen at a single glance.

A determination is made at 224 whether timing requirements can be met by the current shape/positioning of the flex model guides. If not, then the above actions can be repeated as needed until timing goals are met. For example, the process may return back to 222 to perform guide refinement as necessary to accomplish the timing goals of the design. This can be a manual action taken by the user to adjust the location and other parameters of the flexmodel guides. Alternatively, guides can be automatically adjusted to achieve desired timing optimizations goals.

Figure 5:
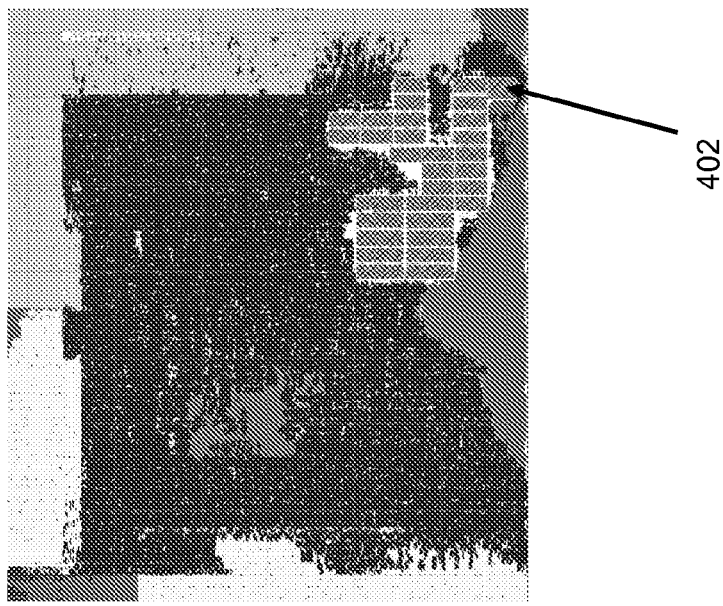
FIG. 5 illustrates a more detailed floorplan that has been created with flexmodels with realistic standard cell information according to some embodiments of the invention.

The next action 206 of FIG. 2A is to implement and verify a more detailed placement onto the floorplan. This step honors the guide placement from the previous step, but provides for a more realistic placement of features of the design. FIG. 2D shows a flowchart of an illustrative approach to implement and verify a more detailed placement onto the floorplan. For example, at 228, flexfillers and standard cell assignments can be configured to force a more realistic placement of interface standard cells in the design. FIG. 5 shows an example of the floorplan of FIG. 4, which has been modified to more realistically account for placement of flexible filler cells and standard cells.

Logic optimizations may be performed at 229. It is noted that by this point, the interface logic paths have already been optimized within the flexmodel as much as possible to meet timing these design-independent and aggressive requirements as discussed above. As such, the external delays for each of the flexmodels are as fast as possible, allowing floorplanning at the chip-level with the flexmodels to achieve results that are as fast as possible. Therefore, one of the benefits of using flex models (which have their interface paths fully optimized) along with a virtual timer (as discussed above), is that for most chip designs there is no longer a need to perform optimization at 229, where in the conventional approaches this step is needed. As noted above, since the flexmodels are created with all of its IO paths optimized to be as fast as possible, even short paths are optimized. The flexmodels eliminates the need to re-spin models with different budgets and the models only need to be created once, and then can be used for many turns of the floorplan (e.g. the process in shown in FIG. 2C and FIG. 2D). As such, no top-level optimization is usually needed and optimization only done once during model creation. This allows for very small runtime since only interface logic of a model is optimized and the runtime scales linearly with the number of hosts (double the hosts, halve the wall clock time). Without flexmodels, conventional approaches would perform optimization after every floorplan change. Therefore, with full optimization during model creation, there is no optimization needed at the top level using flex models. In addition, if there is no optimization during model creation, then logic optimization will be required after every step at the top level (In this case the model's netlist is not static as in the previous case).

It is also possible that optimizations outside of the flexmodel may be needed at 229 to accomplish one or more design goals or timing requirements. For example, such optimizations may include optimization of top-level gates.

Timing analysis is performed again at 230. A determination is made at 234 whether timing requirements can be met by the current shape/positioning of the flex model guides. If not, then guide refinement may be performed as needed at 232 to optimize timing for the design. The previous actions are repeated as needed until the circuit design has been optimized as best as possible or to an otherwise acceptable state, e.g., until timing closure is achieved. As noted above, with fully optimized flexmodels, the logic optimization step is usually not required.

It is noted that timing analysis for step 206 has to account for much more design details (e.g., because of more detailed placement information for standard cells) than the timing analysis that was performed in step 204. As a result, more time and computing resources may be needed to perform the timing analysis for step 206. However, the faster iterations within step 204 will reduce the number of iterations of slower step 206 and overall save time. Note that both steps are fast compared to prior approaches since they both taking advantage of flexmodel technology.

Once timing closure has been achieved, then the next action 208 of FIG. 2A is to define partitions in the floorplan. FIG. 2E shows a flowchart of an illustrative approach to define partitions in the floorplan. At 240, the flexmodels are checked for continuity, and the models within an existing parent may be moved to maintain continuity for the defined partitions, or if they are too discontinuous, the top-level netlist may be restructured. In some embodiments, this action is performed manually by visually checking for continuity. In alternative approaches, this action is automatically performed to adjust flexmodels to maintain continuity.

At 242, fences are added to the design to define the physical boundaries of the partitions for the logical hierarchy. At 244, power, bus, and pipeline planning may also be performed at this stage. Placement and timing-driven routing may be performed at 246 for the floorplan. At 248, feed-through buffers are defined if necessary to maintain timing. Pins are also assigned at this stage at 250. Budgeting, using the flexmodels, can be performed for the design at 252. Once the partitions have been defined and saved at 257, block implementations and post assembly closure can then be performed.

As noted above, the flexmodels of embodiments of the invention may be used in the context of both timing and physical placement analysis. In addition, the flexmodels can be used for congestion analysis as well. Since there are many less standard cells using embodiments of the invention (e.g., 10× less stdcells), this means that there are many less nets (e.g., 10× less nets), and therefore much less congestion (e.g., 10× less congestion). It is noted that the congestion may not correlate well with the full netlist. The congestion can be modeled by reserving routing tracks to correlate with routing tracks which would have been used by a flexmodel's internal register to register nets. There are several approaches that can be taken to implement this functionality. One approach is to globally block a percentage of routing tracks per routing layer. However this approach may unfairly penalize areas which are not part of flexmodels. Alternatively, one can locally block routing tracks within flexible models by using a model (e.g., a LEF model) for flexible fillers which has OBS obstruction statements which block a percentage of routing resources. Another approach would be for the router to recognize the flex fillers, and add routing blockages over the flexfillers just before routing.

Therefore, what has been described is an improved approach for implementing flexible model and performing analysis using those models. This approach provides numerous benefits to electronic designers. First and foremost, the present approach using flexmodels can significantly reduce the instance count of the prototype, e.g., to less than 10 percent of the full-netlist. This level of reduction in instance count can greatly speed up the run time for the analysis process.

In addition, the present approach provides a very accurate way to perform timing analysis at an early stage of the design cycle, but still have great confidence that timing requirements will be met at the top level of the design, even later in the design cycle. This is because the flexmodel is created with all of its I/O paths optimized to be as fast as possible, so that even short paths are optimized. As a result, no top-level logic optimization is needed and optimization only needs to happen once—when models are created. Another advantage is that models only need to be created once, and can then be used for many turns of the floorplan. This eliminates re-spin of models with different budgets.

For example, as compared to approaches that utilize a flat model of the design, the present invention provides a tremendous amount of performance improvement. This is because the present embodiment allows for faster processing because it reduces the number of instances that need to be processed by any of the tools, (i.e. timing analysis, placement, etc.), and also correspondingly requires much less memory to perform analysis of the circuit design. Moreover, the present embodiment only needs to optimize the interface standard cells during model creation rather than optimizing the full design for each change in the floorplan like the traditional flat approach.

Clock Tree Prototyping

This portion of the disclosure describes an improved approach to perform clock tree modeling and prototyping for early-stage analysis of the electronic designs using flexmodels. According to some embodiments, clock tree information is extracted and processed while creating a flexmodel and relevant data is embedded into the flexmodel for use in the downstream design steps. Design exploration and planning are completed using the present techniques. Clock modeling can be utilized both before and after partitions are identified. Clock prototyping is performed to build an accurate hierarchical clock tree using the partition pin locations and latency estimates extracted from the flexmodels.

Figure 11:
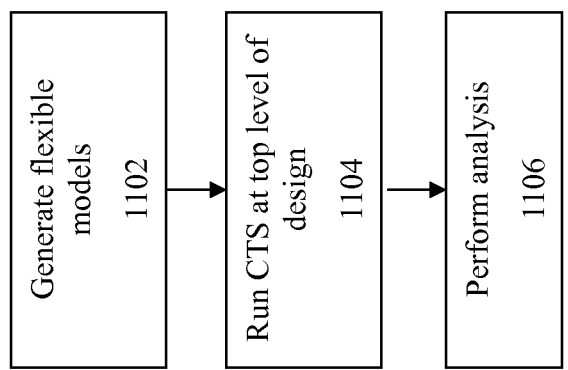
FIG. 11 shows a flowchart an approach for performing clock tree prototyping using flexmodels according to some embodiments of the invention.

FIG. 11 is a flowchart of an approach to use flexmodels to perform clock tree prototyping according to some embodiments of the invention. At 1102, model generation is performed to create abstraction models for electronic design. In the current embodiment, the approach described above is employed to create flexmodels for the electronic design. Partitions may be identified using the approach described in the above section, and used to generate the flexmodels.

For each of the generated models, a single clock buffer with estimated latency is created for each model clock port. The single clock buffer represents the latency it would take for the clock signal to get from the input port pin to any given sink within the flex model. One or more estimation tables can be provided to store the estimated latency values in an accessible manner. Estimation tables can also be provided for other types of modeling data for the circuit. For example, route blockage estimations can also be provided within the estimation tables. In some embodiments, a clock buffer may be associated with other objects as well, such as standard cells.

The general idea is that the flex model constructed in this manner both (a) replaces the substantial portion of the internal paths of a circuit portion with a model that significantly reduced in size and (b) provides a very efficient way to represent clock tree modeling for the module. This means that the prototype circuit design is much smaller than the entirety of the original circuit while retaining meaningful information about clock-related characteristics for the circuit portion being modeled.

At 1104, top level clock implementation is then performed. This action is implemented, for example, by performing clock tree synthesis (CTS) at the top level of the circuit design. However, this action only needs to be taken at the top level of the design, since the smaller individual modules/portions of the design have already been represented as the flex models. Therefore, the CTS activity is only run flat up to the flexmodel sinks.

This approach is in sharp contrast to conventional approaches that would need to perform CTS on the entire circuit design. Since the current embodiment does not need to perform CTS on the entire circuit, this means that the invention provides tremendous savings in terms of time, computation expenses, and ease of use.

Thereafter, at 1106, design exploration and analysis can be performed on the modeled circuit. For example, timing analysis can be performed to make sure that the circuit design meets all appropriate timing requirements. If the timing closure is not achieved, then the circuit design can be refined to correct the identified timing issues. The process of designing/refining the circuit, generating flexmodels, performing timing analysis, and correcting problems can be repeated until timing closure is achieved.

Figure 12:
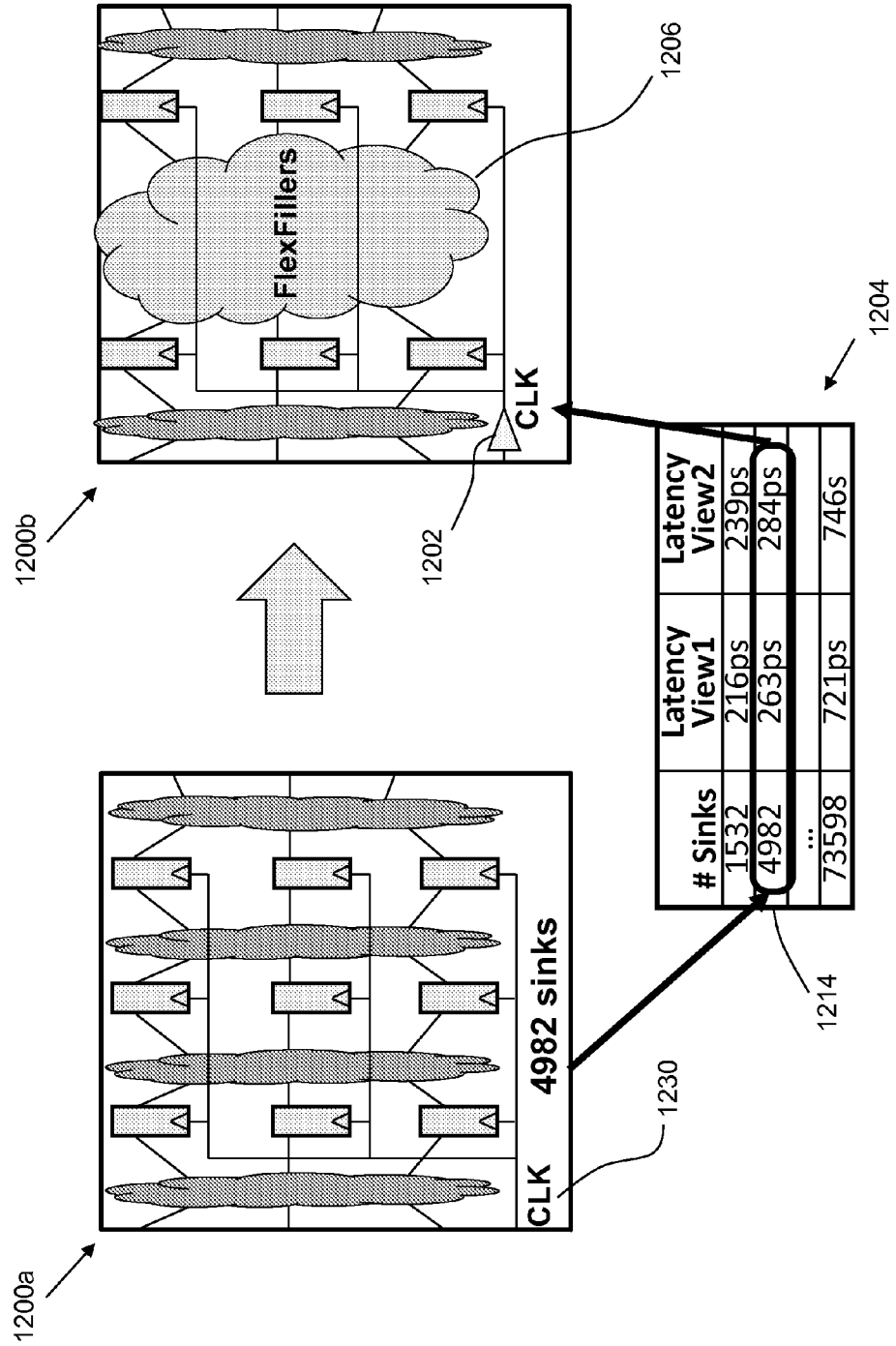
FIG. 12 illustrates an approach for performing clock tree prototyping using flexmodels according to some embodiments of the invention.

FIG. 12 provides an illustrative example for generating a flexmodel according to an embodiment of the invention. The original full module 1200a is shown on the left side of the figure. Using the approach described above, a flexmodel 1200b is generated in which flexfillers 1206 are created to replace internal paths of the module 1200a. For example, the internal R-to-R (register to register) paths within the module 1200a can be replaced with flexible filler cells 1206 in the flexmodel 1200b, where the flexible filler cells can be implemented as a type of standard cells having specified connection and behavioral parameters appropriate as nonfunctional filler cells. Therefore, the flexmodel 1200b would remove internal paths while maintaining paths that extend to input and output ports.

A clock buffer 1202 has been included into the flexmodel 1200b to replace the multiple clock inputs 1230 that exist in the full module 1200a. A latency estimation table 1204 is provided that includes latency estimate values for the flexmodels. Each row in the latency estimation table 1204 corresponds to a module having a different number of sinks. In this example, the module 1200a includes 4982 sinks. Therefore, to obtain the latency estimate for this module, a look-up is performed to the row 1214 in table 1204 that corresponds to this number of sinks. The latency value can then be retrieved from the table 1204 to perform the desired analysis.

The latency estimation table 1204 may include latency estimates for multiple views, where the views correspond to different electrical characteristics. In terms of physical data, there is no change between the different views. However, the views correspond to different RC or process corners that have been established for the set of nods at which the device is expected to operate, e.g., by the fabrication facilities or users. Therefore, a view may be a combination of RC conditions/constraints, design conditions/constraints, and/or operating conditions/constraints. This affects how delays are calculated, and hence will result in different latency estimates for the different views. Any number of latency views may be represented in the latency estimate table 1204, as needed to facilitate multi-mode multi-corner (MMMC) analysis.

The estimation tables can be constructed by performing targeted sampling of the modules/flexmodels, performing analysis upon the selected samples, and then using that data to extrapolate estimates for the non-sampled modules/models.

Figure 13:
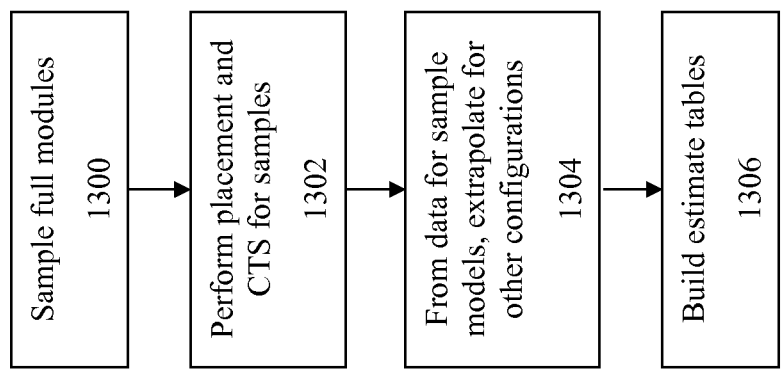
FIG. 13 shows a flowchart an approach for building estimate tables for flexmodels according to some embodiments of the invention.

FIG. 13 is a flowchart of an approach to generate the estimation tables according to some embodiments of the invention. At 1300, sampling is performed upon the set of modules that have been converted to flexmodels. Any suitable approach can be taken to perform the sampling action. The goal, however, is to perform the minimum amount of sampling that is needed to provide a reliable enough set of data that can be used to accurately estimate data for the non-sampled set of modules/models. While sampling 100% of the modules would provide the most accurate set of data, this approach would also be quite computationally expensive and would not provide significantly greater benefit to a smaller sample size when compared the excessively higher cost. In some embodiments, a sampling rate of 10% is employed, i.e., 10 modules would be sampled and processed out of a total of 100 modules to be converted to flexmodels. This percentage can, of course, be changed within the scope of the invention as needed by any particular implementation of the invention.

Any criteria or statistical method may be used to select the sampled set of modules. One possible approach is to select the modules such that they provide a statistically representative set of criteria from across the total set of modules to be converted into flexmodels. Some of the criteria that may be considered include, for example, (a) the number of sinks in the modules, (b) the number of standard cell pins as compared to standard cell area, (c) module size, (d) module aspect ratio, and/or (e) how much of module is covered by hard memory/macros versus standard cells.

At 1302, placement, routing, and CTS are performed for each of the sampled modules. In effect, real clocks are built for these sampled modules. This provides hard latency numbers for the corresponding modules. This latency data for the sample set of modules can then be used, at 1304, to extrapolate the latency numbers for the non-sampled modules. Thereafter, at 1306, the estimate table is populated with the latency for both the sampled modules and the non-sampled modules.

Figure 14:
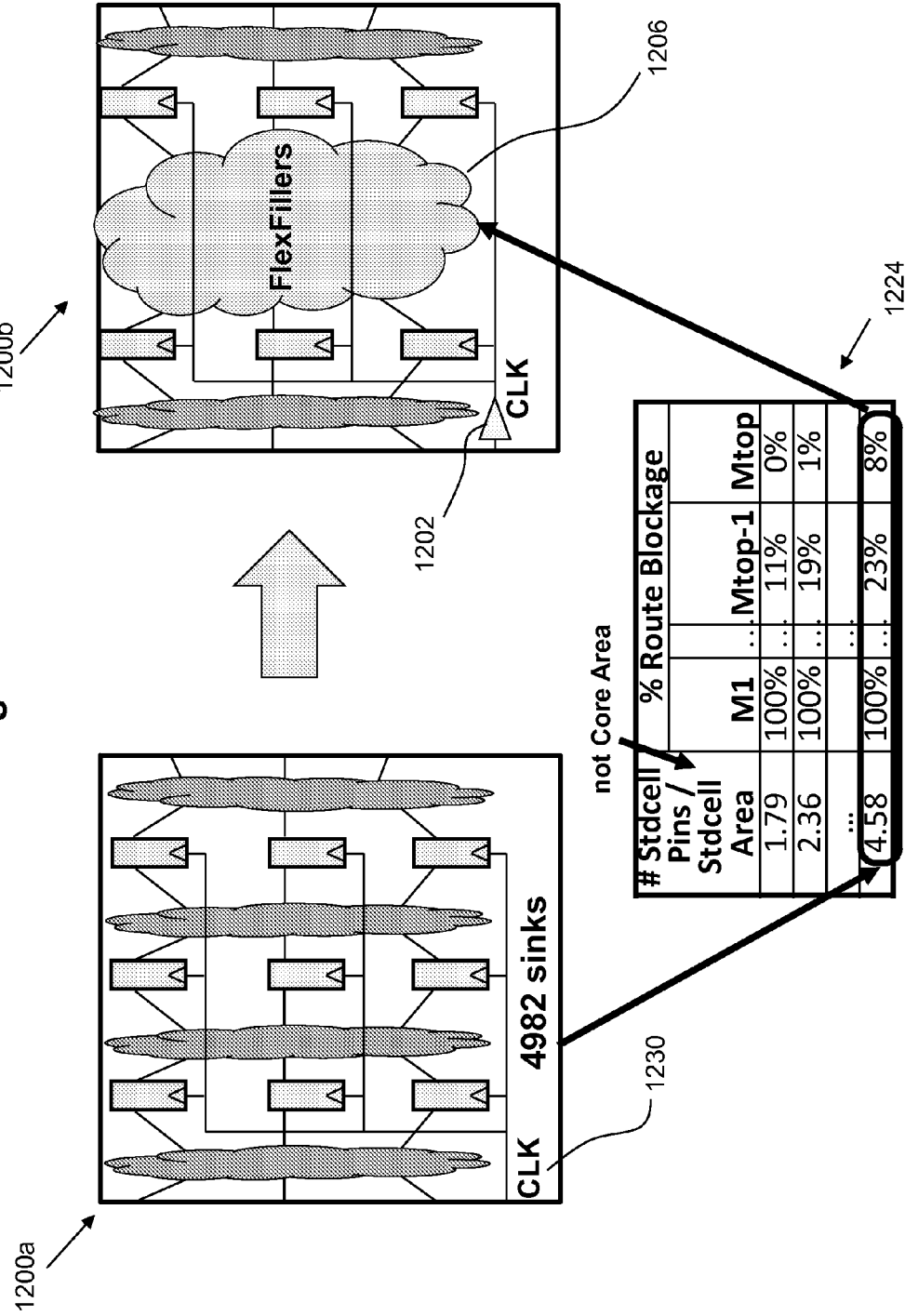
FIG. 14 illustrates an alternate estimation table according to some embodiments of the invention.

Other types of estimation tables can also be created to facilitate analysis of the circuit design. FIG. 14 shows an example another type of estimation table 1224, in which table 1224 provides an estimation of route blockages for the modules/models. The data in this table 1224 provides an estimate of the amount of routing blockage that should be anticipated when implementing the module 1200*a*. This data is used to calculate, when routing to the sinks, estimations of whether a blockage will exist for a given route.

In some embodiments, this estimation is performed by calculating the percentage of standard cell pins relative to the standard cell area, on the theory that more datapath oriented designs should correspond to greater amounts of blockage. Therefore, less pins per standard cell area should correspond to lower levels of blockage and more pins per standard cell should correspond to greater amounts of blockage. The blockage estimates in table 1224 are provided for each metal layer.

As noted above, a top level clock implementation is performed after creation of the flexmodels. This means that clock tree synthesis (CTS) is performed at the top level of the circuit design, where CTS is not necessary for the lower levels of the design that already have been converted to flexmodels.

Figure 15:
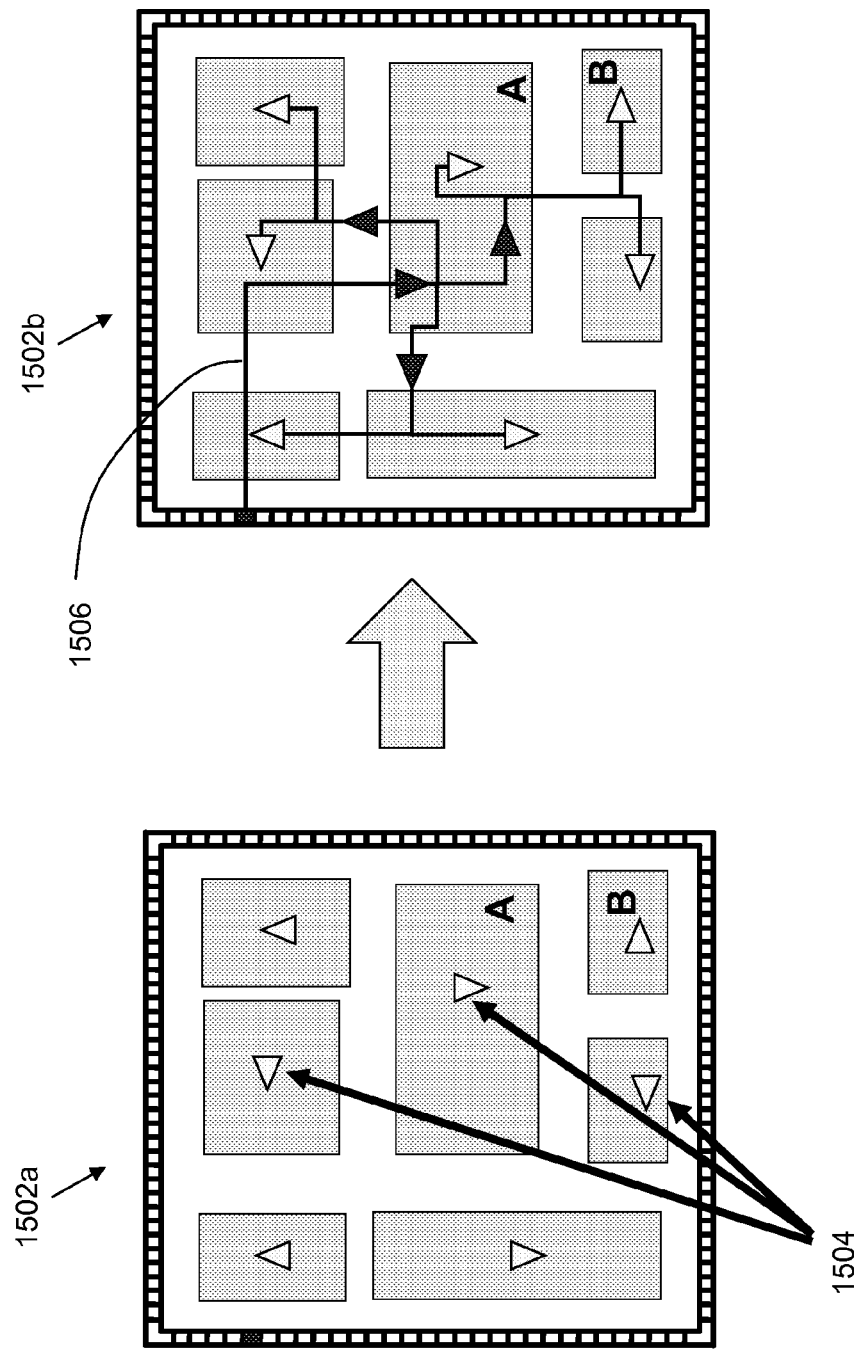
FIG. 15 illustrates design exploration and analysis using flexmodels according to some embodiments of the invention.

FIG. 15 illustrates this aspect of the invention. The top portion shows an electronic design 1502*a* where flexmodels have already been created to include the single clock buffer 1504 for each flexmodel. At the top level of the design, CTS is performed to generate a clock tree 1506 at that level of the design. Thereafter, analysis can be performed (e.g., timing analysis), where data regarding latency values from within the flexmodels are obtained by performing a look-up into the appropriate latency estimation table, where the latency estimate is annotated as a clock buffer delay arc. The route blockage estimation table can be accessed to provide route blockage estimates for the flexfillers within the models.

Figure 16:
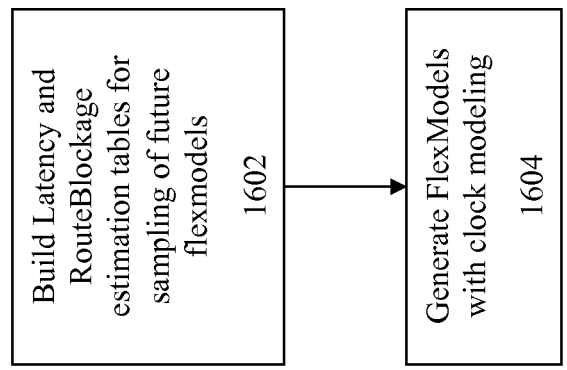
FIG. 16 shows a flowchart an approach for implementing flexmodels with clock modeling according to some embodiments of the invention.

FIG. 16 shows a flowchart of an alternate embodiment of the invention, where clock tree synthesis is performed for the flexmodels. At 1602, latency and route blockage estimation tables are constructed for the flexmodels. These tables are constructed using, for example, the approach described above in which sampling is performed upon the set of modules that are to be converted to flexmodels. In some embodiments, a sampling rate of 10% is employed, i.e., 10 modules would be sampled and processed out of a total of 100 modules to be converted to flexmodels. Placement, routing, and CTS are performed for each of the sampled modules, where real clocks are built for these sampled modules. This provides hard latency numbers for the corresponding modules, where the latency data for the sample set of modules can then be used to extrapolate the latency numbers for the non-sampled modules and then populated into the latency table for both the sampled modules and the non-sampled modules.

At 1604, the values in the latency table are then used to perform clock generation within the flexmodels, based upon the calculated latencies. Since the flexmodels have a significantly reduced set of components as compared to the full modules, this permits the clock generation process to be performed relatively quickly and inexpensively. Moreover, the values in the latency and route blockage tables provide the data to be assigned to the clock tree specification for the flexmodel in the context of the design. The values for the sampled models are used to extrapolate the values for the other non-sampled configurations.

The result of this approach is that it generates clock modeling where one does not have to directly use the latency values in the estimate table to perform verification/analysis for the design. This is helpful, for example, when working with legacy EDA analysis tools that are not configured to work with structures such as latency estimation tables. Instead, such legacy systems/tools can better work with design data generated with clock tree synthesis, which can therefore interface with the current embodiment in which the flexmodels are generated with CTS.

Figure 17:
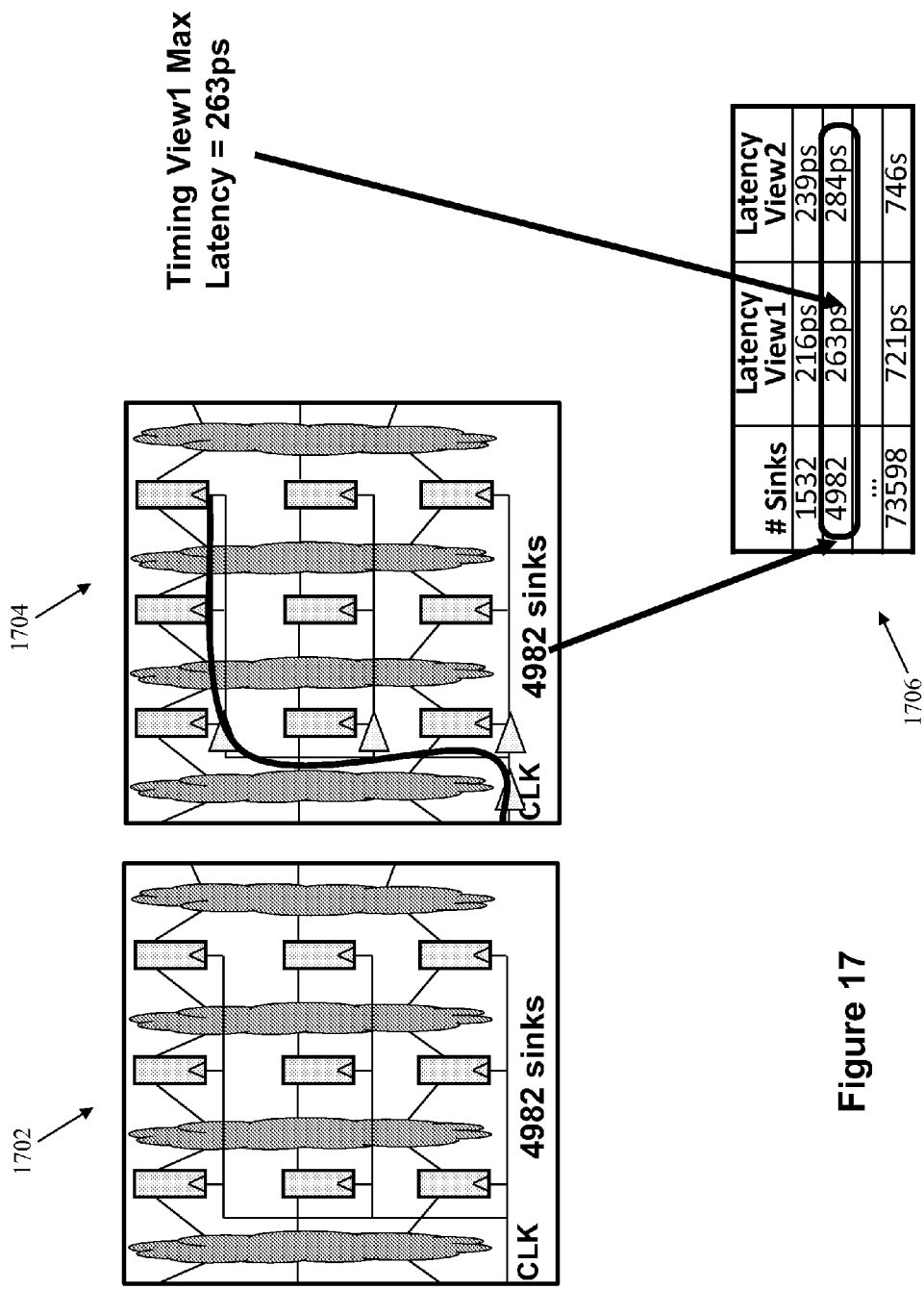
FIGS. 17 and 18 illustrate flexmodels generated with clock modeling according to some embodiments of the invention.
Figure 18:
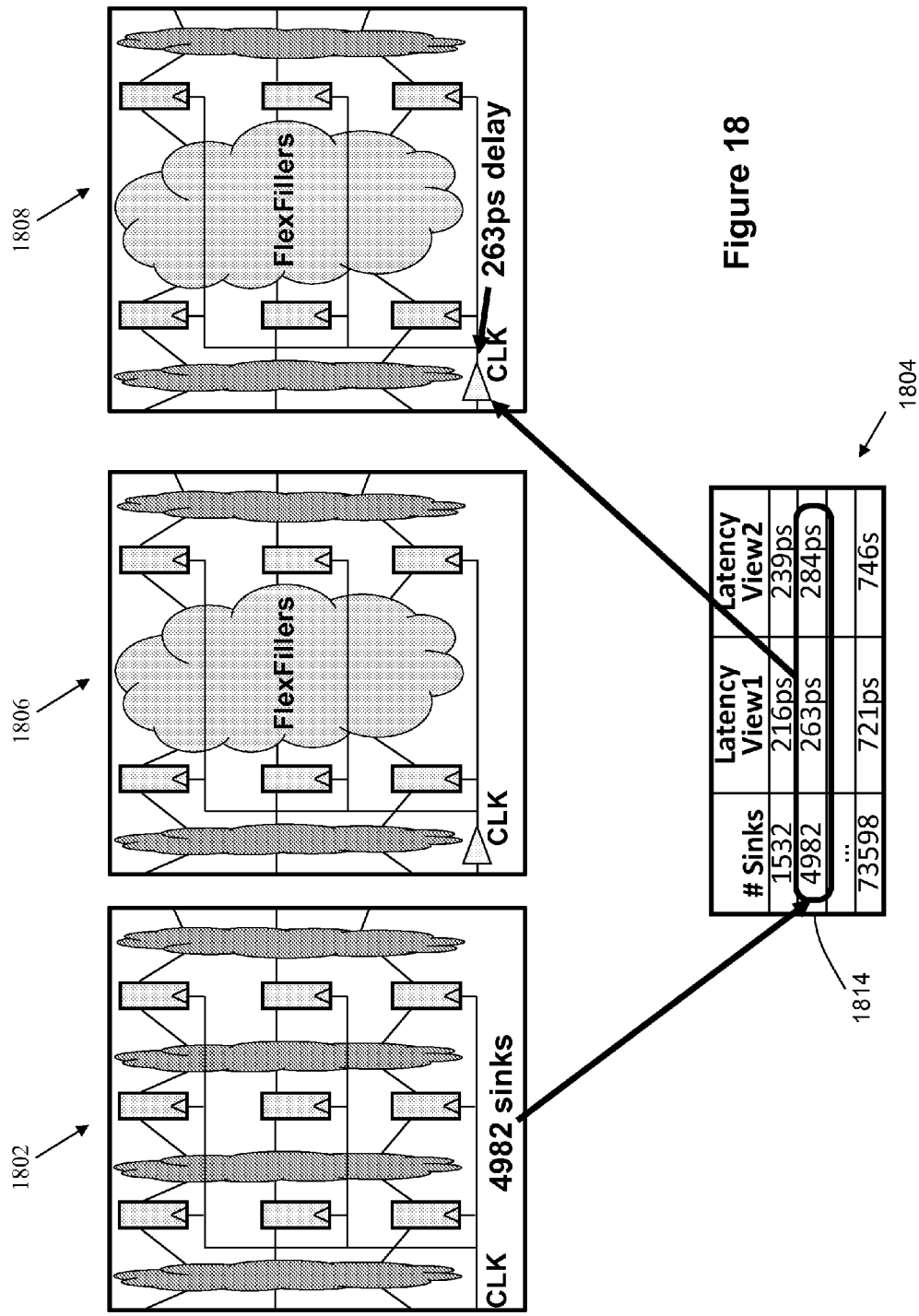

FIGS. 17 and 18 illustrate this approach. FIG. 17 illustrates building of a latency table from sampled future flexmodels. 1702 illustrates a full netlist for a sampled module that is placed, and possibly optimized. 1704 illustrates the sample module after performing clock tree synthesis and analysis. The analysis results for this module (having 4982 sinks) are placed into the latency estimation table 1706 at the row identified with "4982" in the "# sinks" column. The latency values in the other rows in the estimation table 1706 for non-sampled modules are generated by extrapolating from the values for the sampled modules.

As shown in FIG. 18, the full netlist for the module having 4982 sinks is illustrated as 1802. This corresponds to the latency value in row 1814 in the latency estimation table 1804. 1808 shows that module where the internal R2R logic has been replaced with flexfillers. Thereafter, as shown in 1808, the buffer for the flexmodel is annotated with the appropriate latency from the latency estimation table 1804.

Some embodiments of the invention pertain to an approach for implementing clock seed buffers in the electronic design. The idea is that OCV effects may be based, at least in part, upon how much of the clock tree is in common. Therefore, at the top level of the design, clock seed buffers can be inserted at clock branch points to control CPPR. This will allow controllable portions of the chip to share common clock tree paths so that the variation effects for those grouped-together circuit portions will be relatively constant.

Figure 19:
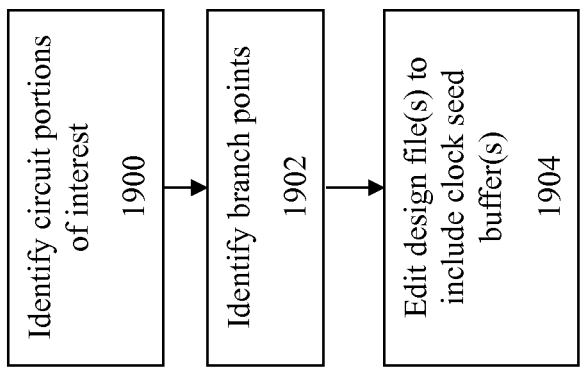
FIG. 19 shows a flowchart an approach for implementing clock seed buffers according to some embodiments of the invention.

FIG. 19 shows a flowchart of an approach to implement clock seed buffers according to an embodiment of the invention. At 1900, identification is made of the circuit portions that should be linked together to maintain relatively constant delay effects from possible manufacturing variations. At 1902, the branch points corresponding to these identified circuit portions are then identified. Thereafter, at 1904, one or more design files are edited to include the desired clock seed buffer configuration.

Figure 20A:
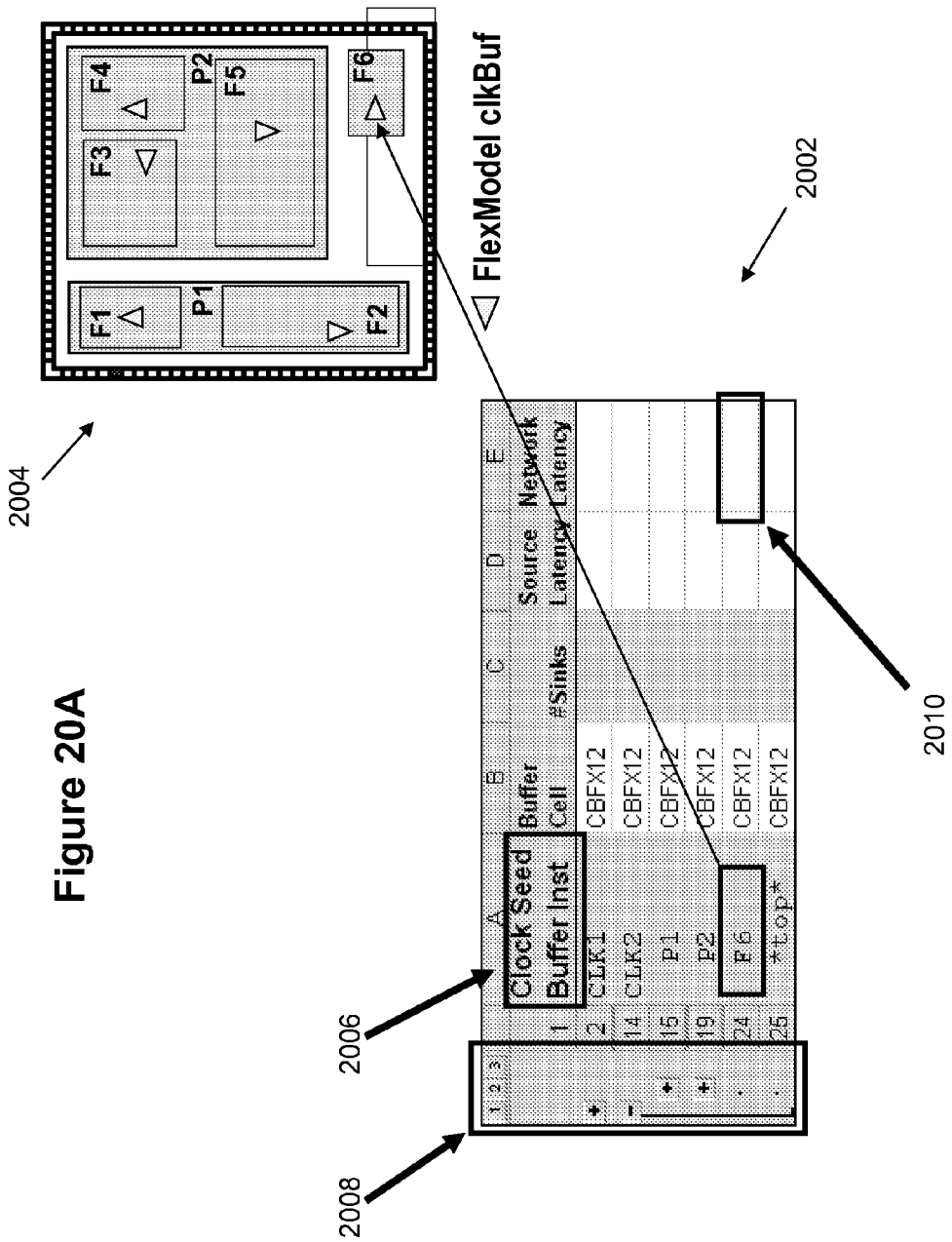
FIG. 20A-C illustrate an approach for implementing clock seed buffers according to some embodiments of the invention.

FIG. 20A illustrates an example interface 2002 that can be used to implement clock seed buffer data for an electronic design 2004. The interface 2002 includes a column 2006 to identify clock seed buffer instances for portions of the design 2004. For example, row 24 corresponds to the clock seed buffer for module F6. The column 2006 starts with the clock's name that represents the clock's source. In some embodiments, the default is for there to be one clock seed buffer/pin at a partition. There is one clock seed buffer for each flexmodel with one clock seed buffer for logic at the top level of the hierarchy which is not from flexmodels or partitions.

Control interface object 2008 is used to expand or collapse clocks and their hierarchies in interface 2002. Different portions of the interface 2002 may be used to provide information about the clock seed buffer instances and to edit/override data for the instances. For example, the user can edit field 2010 to override latency estimates from flexmodel generation for a given instance.

Figure 20B:
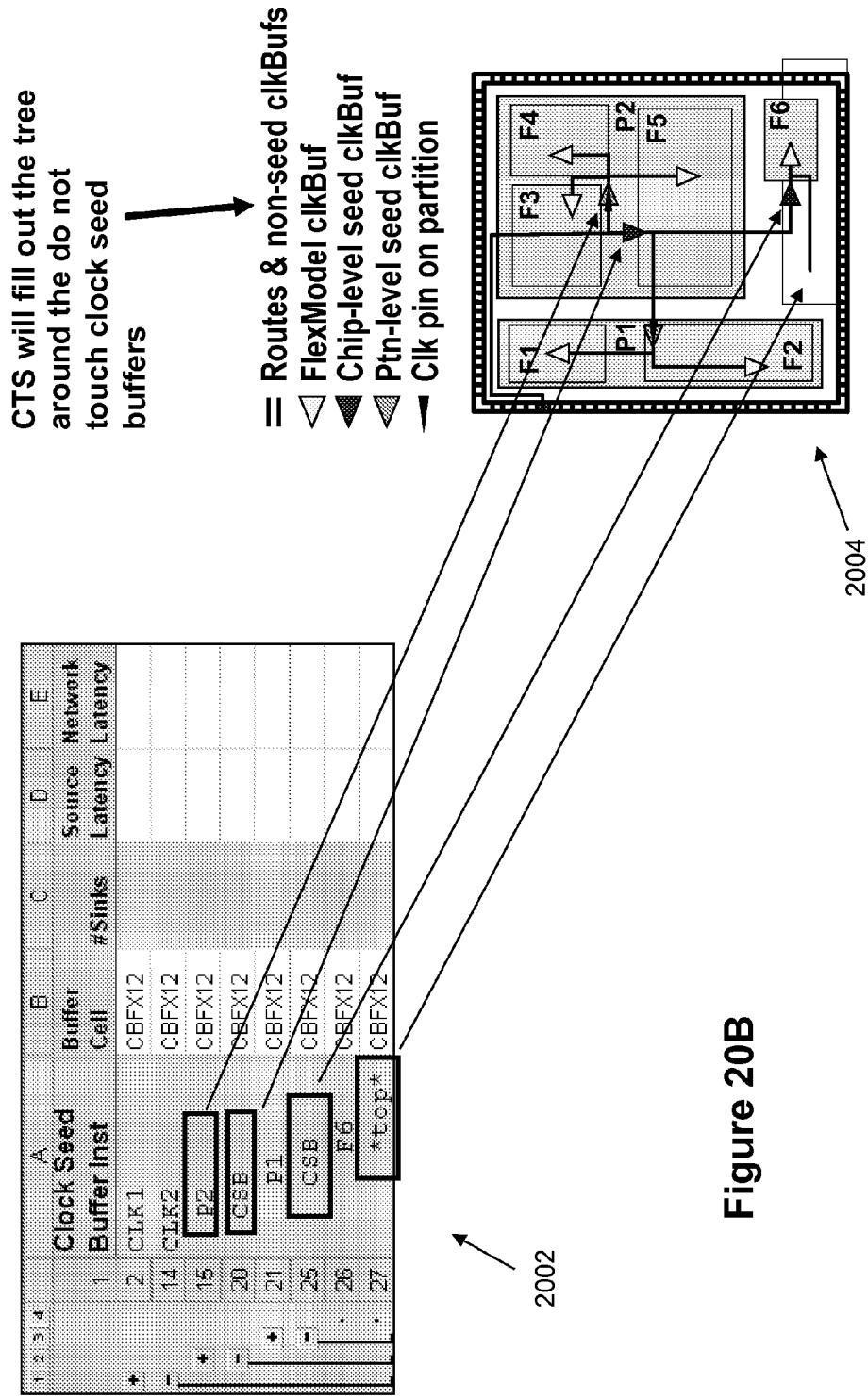

FIG. 20B illustrates the use of interface 2002 to edit clock seed buffer information for electronic design 2004. The user can use perform editing using interface 2002 by modifying the values in column 2006 as appropriate to include clock seed buffers (CBSs) where appropriate. This moves existing clock seed buffers underneath the newly added CSBs.

Figure 20C:
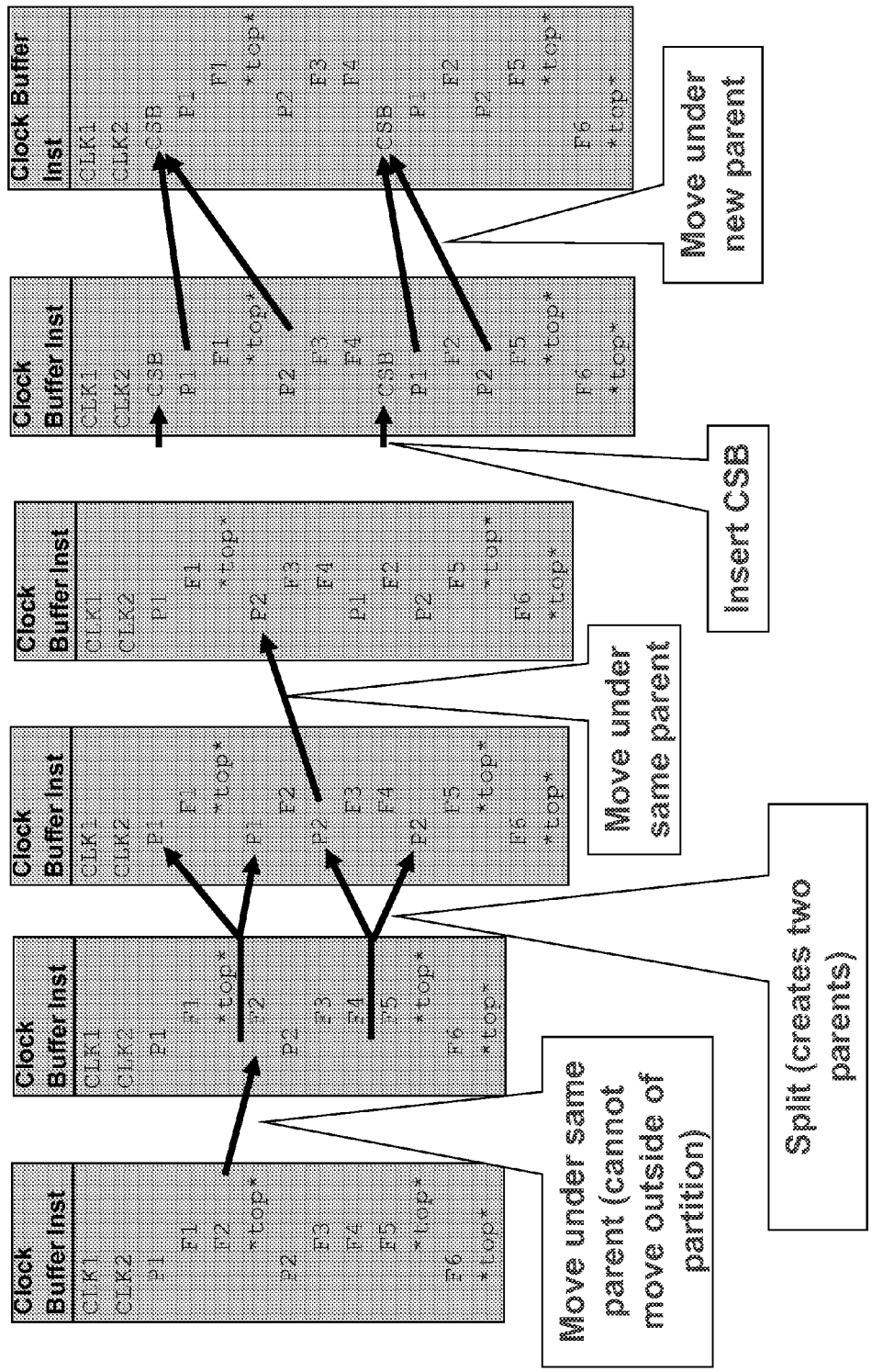

FIG. 20C illustrates some example editing actions that may be implemented for the clock seed buffer interface. These example actions include (a) moving under same parent; (b) splitting to create two parents; (c) moving under the same parent; (d) inserting CSB; and (e) moving under a new parent.

As previously noted, the embodiments of the present invention can be implemented to perform clock modeling both before and after partitioning. This permits the clock modeling to be used form the beginning of the EDA design/verification process. However, accuracy is improved as the process continues and partitions are identified. For example, after the partitions have been identified, then the system and method can identify locations for clock branching points at the partitions. This allows for more accurate knowledge for the clock branching points.

Figure 21:
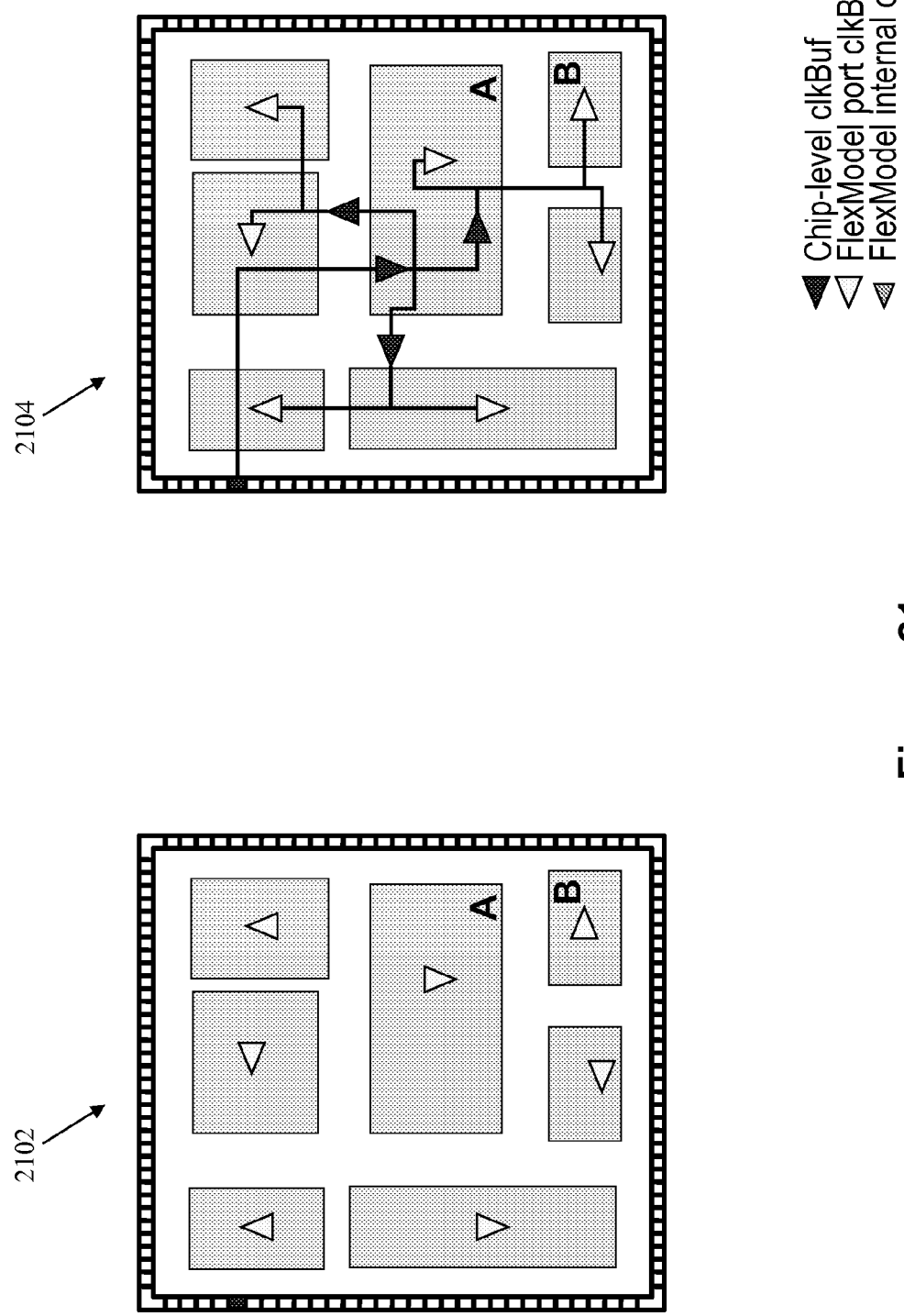
FIGS. 21 and 22 illustrate CTS prototyping before partitioning of the design according to some embodiments of the invention.
Figure 22:
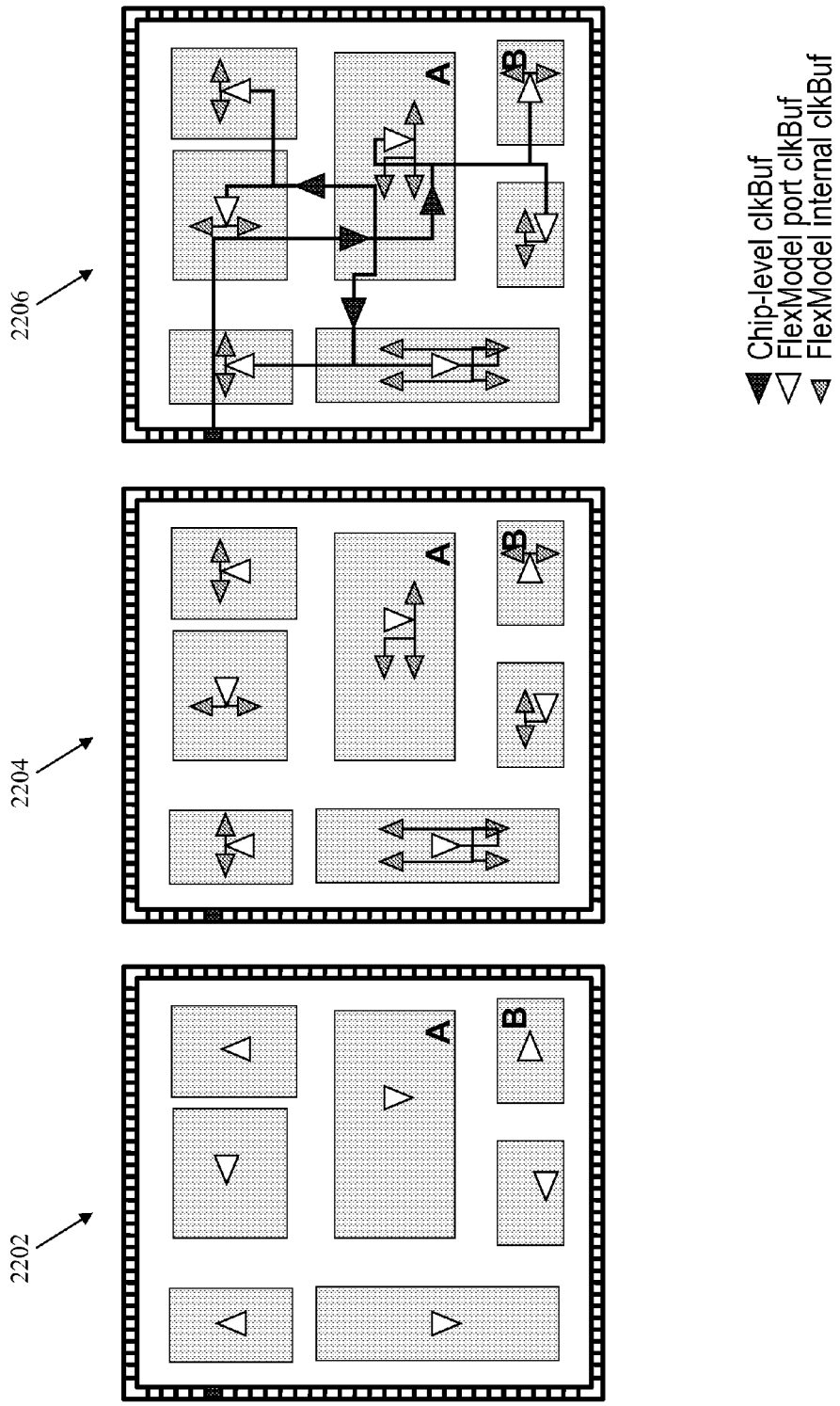

FIGS. 21 and 22 illustrate pre-partition prototyping according to some embodiments of the invention. FIG. 21 illustrates CTS prototyping with annotated latencies on the flexmodel clock buffers. 2102 illustrates an example design with buffers at the clock ports of the flexmodels with latencies annotated. 2104 provides an illustration of the sample design in which the clock level tree has been built.

FIG. 22 illustrates CTS prototyping with no annotated latencies on the flexmodel clock buffers. 2202 illustrates an example design with buffers at the clock ports of the flexmodels. 2204 shows the example design where the clock tree has been built within the flexmodels that honor the latency from the lookup table(s). Thereafter, as shown in 2206, the chip-level clock tree is built for the example design.

Therefore what has been described above is an improved approach for implementing flexible models to perform efficient prototyping of clock structures in electronic designs. The flexible abstraction models include clock abstractions to more efficiently perform analysis upon the electronic designs. This allows greater analysis efficiency with regards to timing analysis and physical analysis. This approach is in sharp contrast to conventional approaches that would need to perform CTS on the entire circuit design. Since the current embodiment does not need to perform CTS on the entire circuit, this means that the invention provides tremendous savings in terms of time, computation expenses, and ease of use.

The present solution allows for accurate estimations of clock tree structures and will all accurate modeling of OCV/CPPR effects. This is important since CPPR modeling is critical on early stages of design exploration in order to generate a realistic timing constrains for block and top level implementation The present solution also provides for very fast clock estimation at early design planning stages. In addition, it permits partition clock pin location recommendations with OCV budgets having CPPR information.

System Architecture Overview

Figure 23:
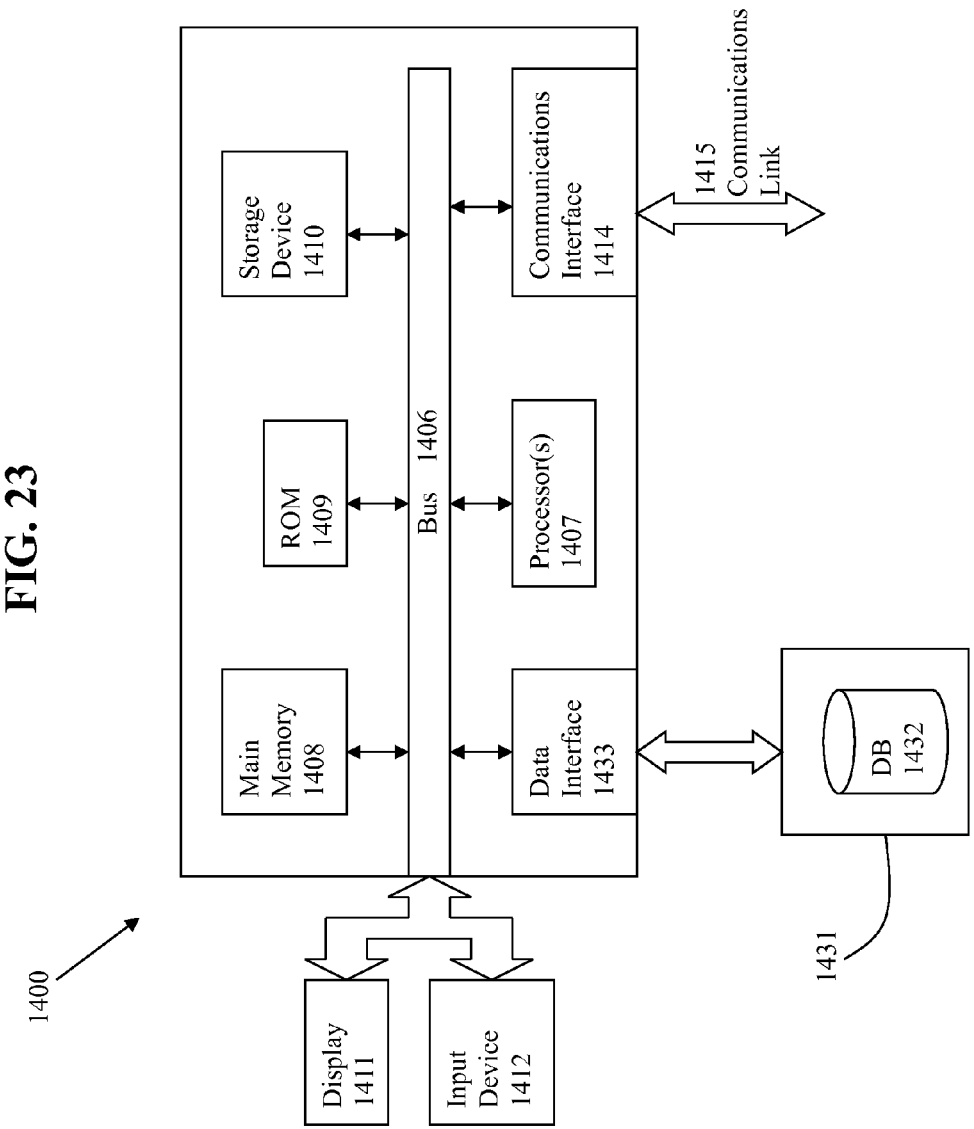
FIG. 23 shows an architecture of an example computing system with which the invention may be implemented.

FIG. 23 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. The computer system may also use a data interface 1433 to communicate with a database 1432 in a computer readable storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for implementing an electronic design, comprising:
   using a processor to prototype the circuit design with a flexible model, wherein
      the flexible model replaces internal paths in the flexible model with filler content and retains interface logic portions of a netlist; and
      the flexible model comprises a clock tree abstraction for the circuit design, and
   propagating clock information by performing clock implementation for a top hierarchical level of the circuit design with at least the clock tree abstraction, without performing the clock implementation for hierarchical levels below the top level of the circuit design.

2. The method of claim 1, in which the clock tree abstraction comprises a clock buffer for the flexible model that represents latency for the flexible model.

3. The method of claim 2, in which one clock buffer is associated with one clock port for the flexible model.

4. The method of claim 1, in which the latency is provided from latency estimation data.

5. The method of claim 4, in which the latency estimation data is generated by sampling a subset of modules to be converted to flexible models, performing clock tree synthesis for the subset of modules, and extrapolating the latency estimation data for non-sampled modules using results from performing the clock tree synthesis.

6. The method of claim 1, in which estimation data is provided for the flex model pertaining to route blockage.

7. The method of claim 1, further comprising:
   creating the flexible model;
   configuring a floorplan that includes the flexible model;
   performing clock tree synthesis at a top level of the electronic design without performing clock tree synthesis for the internal structure of the flexible model; and
   performing analysis for the electronic design.

8. The method of claim 7, further comprising:
   verifying feasibility of the floorplan;
   providing a more detailed floorplan and verifying feasibility of the more detailed floorplan; and
   defining partitions for the more detailed floorplan.

9. The method of claim 1, in which the flexible model is created by a process comprising:
   selecting a module from a netlist to model as the flexible model;
   replacing the internal paths with flexible filler cells;
   configuring timing for the flexible model so that the interface paths for the flexible model are the negative paths; and
   performing budgeting for the flexible model.

10. The method of claim 1, further comprising editing of clock seed buffer data for the electronic design.

11. The method of claim 10, in which an interface is provided to edit the clock seed buffer data, wherein the interface comprises an expandable, collapsible, and editable structure for insertion of clock seed buffers.

12. The method of claim 1, in which the flexible model is generated with clock modeling.

13. The method of claim 1, in which the clock tree abstraction is generated during a time period including at least one of before partitioning of the circuit design and after partitioning of the circuit design.

14. The method of claim 13, in which latencies are provided by annotation of clock buffers or by lookup in an estimate table.

15. A computer program product embodied on a computer usable medium, the computer readable medium having stored thereon a sequence of instructions which, when executed by a processor causes the processor to execute method for implementing an electronic design, the method comprising:
   using a processor to prototype the circuit design with a flexible model, wherein
      the flexible model replaces internal paths in the flexible model with filler content and retains interface logic portions of a netlist; and
      the flexible model comprises a clock tree abstraction for the circuit design; and
   propagating clock information by performing clock implementation for a top level of the circuit design with at least the clock tree abstraction, without performing the clock implementation for levels below the top level of the circuit design.

16. The computer program product of claim 15, in which the clock tree abstraction comprises a clock buffer for the flexible model that represents latency for the flexible model.

17. The computer program product of claim 15, in which the latency is provided from latency estimation data.

18. The computer program product of claim 17, in which the latency estimation data is generated by sampling a subset of modules to be converted to flexible models, performing clock tree synthesis for the subset of modules, and extrapolating the latency estimation data for nonsampled modules using results from performing the clock tree synthesis.

19. The computer program product of claim 15, in which estimation data is provided for the flex model pertaining to route blockage.

20. The computer program product of claim 15, further comprising:
   creating the flexible model;
   configuring a floorplan that includes the flexible model;
   performing clock tree synthesis at a top level of the electronic design without performing clock tree synthesis for the internal structure of the flexible model; and
   performing analysis for the electronic design.

21. The computer program product of claim 20, further comprising:
   verifying feasibility of the floorplan;
   providing a more detailed floorplan and verifying feasibility of the more detailed floorplan; and
   defining partitions for the more detailed floorplan.

22. The computer program product of claim 15, further comprising editing of clock seed buffer data for the electronic design.

23. The computer program product of claim 22, in which an interface is provided to edit the clock seed buffer data, wherein the interface comprises an expandable, collapsible, and editable structure for insertion of clock seed buffers.

24. The computer program product of claim 15, in which the flexible model is generated with clock modeling.

25. The computer program product of claim 15, in which the clock tree abstraction is generated during a time period including at least one of before partitioning of the circuit design and after partitioning of the circuit design.

26. The computer program product of claim 25, in which latencies are provided by annotation of clock buffers or by lookup in an estimate table.

27. A system for implementing an electronic design, comprising:
   a processor;
   a memory for holding programmable code, wherein the programmable code includes instructions for the processor to:

prototype the circuit design with a flexible model, wherein
the flexible model replaces internal paths in the flexible model with filler content and retains interface logic portions of a netlist, and
the flexible model comprises a clock tree abstraction for the circuit design; and
propagate clock information by performing clock implementation for a top level of the circuit design with at least the clock tree abstraction, without performing the clock implementation for levels below the top level of the circuit design.

28. The system of claim 27, in which the clock tree abstraction comprises a clock buffer for the flexible model that represents latency for the flexible model.

29. The system of claim 28, in which one clock buffer is associated with one clock port for the flexible model.

30. The system of claim 27, in which the latency is provided from latency estimation data.

31. The system of claim 30, in which the latency estimation data is generated by sampling a subset of modules to be converted to flexible models, performing clock tree synthesis for the subset of modules, and extrapolating the latency estimation data for non-sampled modules using results from performing the clock tree synthesis.

32. The system of claim 27, in which estimation data is provided for the flex model pertaining to route blockage.

33. The system of claim 27, wherein the programmable code further includes instructions for creating the flexible model, configuring a floorplan that includes the flexible model, performing clock tree synthesis at a top level of the electronic design without performing clock tree synthesis for the internal structure of the flexible model, and performing analysis for the electronic design.

34. The system of claim 27, further comprising an interface to edit the clock seed buffer data, wherein the interface comprises an expandable, collapsible, and editable structure for insertion of clock seed buffers.

35. The system of claim 27, in which the flexible model is generated with clock modeling.

36. The system of claim 27, in which the clock tree abstraction is generated during a time period including at least one of before partitioning of the circuit design and after partitioning of the circuit design.

37. The system of claim 36, in which latencies is provided by annotation of clock buffers or by lookup in an estimate table.

* * * * *